United States Patent
Standke et al.

(10) Patent No.: US 9,780,572 B2
(45) Date of Patent: Oct. 3, 2017

(54) WIRELESS POWER MULTI-COIL MUTUAL INDUCTION CANCELLATION METHODS AND APPARATUS

(71) Applicant: QUALCOMM Incorporated, San Diego, CA (US)

(72) Inventors: Randy Edward Standke, San Diego, CA (US); Charles Edward Wheatley, III, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 202 days.

(21) Appl. No.: 14/524,944

(22) Filed: Oct. 27, 2014

(65) Prior Publication Data
US 2016/0118806 A1 Apr. 28, 2016

(51) Int. Cl.
| H02J 5/00 | (2016.01) |
| H01F 38/14 | (2006.01) |
| H02J 17/00 | (2006.01) |
| H01F 27/28 | (2006.01) |

(52) U.S. Cl.
CPC .............. *H02J 5/005* (2013.01); *H01F 38/14* (2013.01); *H02J 17/00* (2013.01); *H01F 27/2804* (2013.01)

(58) Field of Classification Search
CPC ........... H02J 5/005; H02J 7/025; H01F 38/14; G01D 5/145
See application file for complete search history.

(56) References Cited

U.S. PATENT DOCUMENTS

| 5,576,622 A * | 11/1996 | Morrone | .............. G01R 33/422 324/318 |
| 5,973,495 A * | 10/1999 | Mansfield | .......... G01R 33/3628 324/318 |

(Continued)

FOREIGN PATENT DOCUMENTS

| WO | WO-2011145953 A1 | 11/2011 |
| WO | WO-2014035987 A2 | 3/2014 |

OTHER PUBLICATIONS

International Search Report and Written Opinion—PCT/US2015/053495—ISA/EPO—Jan. 5, 2016.

*Primary Examiner* — Giovanni Astacio-Oquendo
*Assistant Examiner* — Alvaro Fortich

(57) ABSTRACT

This invention describes a method and apparatus to cancel the mutual inductance between mutually coupled transmit coils, each of the transmit coils fed by individual power amplifiers, and the transmit coils all sharing a common ground with the power amplifiers. The methods and systems disclosed consist of coupling the return legs of each transmit coil to a mutual inductance cancellation circuit near a common ground return connection. The cancellation circuit uses a combination of inductors and capacitors to bridge various combinations of the transmit coils without physically connecting the "bridged" transmit coils. Transmit coils "bridged" using inductors have positive mutual inductance added to them, while transmit coils "bridged" using capacitors have negative mutual inductance added to them. Additionally, manipulation of the transmit coil overlap of overlapping transmit coils and/or manipulation of the location of the cancellation circuit can be used finely tune the mutual inductance between the transmit coils.

31 Claims, 12 Drawing Sheets

(56) References Cited

U.S. PATENT DOCUMENTS

| | | | |
|---|---|---|---|
| 6,150,816 A * | 11/2000 | Srinivasan | G01R 33/3415 324/318 |
| 6,348,794 B1 | 2/2002 | Nabetani et al. | |
| 6,977,571 B1 * | 12/2005 | Hollis | G01R 33/288 324/319 |
| 2001/0015473 A1 * | 8/2001 | Lemaire | H01F 17/0006 257/531 |
| 2006/0017447 A1 * | 1/2006 | Bertness | G01R 31/3627 324/538 |
| 2006/0038621 A1 * | 2/2006 | Shiramizu | H01L 23/5227 331/36 L |
| 2006/0181381 A1 * | 8/2006 | Markiewicz | G01R 33/3875 335/216 |
| 2007/0145830 A1 * | 6/2007 | Lee | H02J 5/005 307/135 |
| 2010/0297938 A1 | 11/2010 | Sala et al. | |
| 2012/0001715 A1 | 1/2012 | Taracila et al. | |
| 2013/0119779 A1 * | 5/2013 | Jung | H01F 38/14 307/104 |
| 2013/0200832 A1 * | 8/2013 | Oh | H02P 6/00 318/400.37 |
| 2013/0229061 A1 * | 9/2013 | Budhia | H02J 5/005 307/104 |
| 2014/0028111 A1 | 1/2014 | Hansen et al. | |
| 2014/0062213 A1 * | 3/2014 | Wheatley, III | H01F 38/14 307/104 |
| 2014/0091640 A1 | 4/2014 | Scholz et al. | |
| 2014/0266018 A1 * | 9/2014 | Carobolante | H02J 7/025 320/108 |
| 2015/0001950 A1 * | 1/2015 | Chung | H01F 38/14 307/104 |
| 2015/0236526 A1 * | 8/2015 | Jadidian | H02J 5/005 320/108 |

\* cited by examiner

WIRELESS POWER MULTI-COIL MUTUAL INDUCTION CANCELLATION METHODS AND APPARATUS

TECHNICAL FIELD

The described technology generally relates to wireless power. More specifically, the disclosure is directed to devices, systems, and methods related to wireless power transfer comprising multiple transmit coils and cancellation of mutual inductance between the multiple transmit coils when the transmit coils are closely spaced to or overlap each other.

BACKGROUND

An increasing number and variety of electronic devices are powered via rechargeable batteries. Such devices include mobile phones, electric vehicles, portable music players, laptop computers, tablet computers, computer peripheral devices, communication devices (e.g., Bluetooth devices), digital cameras, hearing aids, and the like. While battery technology has improved, battery-powered electronic devices increasingly require and consume larger amounts of power, thereby often requiring recharging. Recharging systems, such as wireless device charging systems, may experience problems of mutual inductance when the charging system includes multiple transmit coils that are closely spaced or overlapping. The problems of mutual inductance do not exist in wireless charging systems that only have a single transmit coil or a plurality of transmit coils fed with a single power amplifier for the one or more power amplifiers. Wireless charging systems using multiple transmit coils, each fed by a separate power amplifier, may have advantages such as being able to provide wireless energy over a larger area, where that energy may be used for charging multiple devices. Additionally, the use of multiple transmit coils may provide a more uniform magnetic field and may improve efficiency. However, the use of multiple transmit coils has a disadvantage in that, in addition to magnetically coupling with receiving coils, the transmit coils may also couple with the other active transmit coils. This transmitter-to-transmitter coupling causes undesirable interaction between the transmitters. Thus, there is a need for systems and methods for minimizing mutual inductance between a plurality of active transmit coils each having separate power amplifiers.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description," one will understand how the features of the various embodiments of this invention provide advantages that include improved power and impedance measurements in wireless power systems.

One aspect of this invention includes an apparatus for transmitting wireless power to a first receiver. The apparatus comprises a first driver coil, a second driver coil, and a third driver coil. The apparatus further comprises a circuit operably coupled to the first driver coil, the second driver coil, and the third driver coil. In some aspects, the circuit may be configured to at least partially cancel mutual inductance between the first driver coil, the second driver coil, and the third driver coil. In some aspects, the first, second, and third driver coils may be configured to share a common ground via the circuit.

Another aspect disclosed is a method for transmitting wireless power to a receiver. The method comprises generating a first wireless field via a first driver coil. The method further comprises generating a second wireless field via a second driver coil. The method further comprises generating a third wireless field via a third driver coil. The method may further comprise at least partially cancelling mutual inductance between the first driver coil, the second driver coil, and the third driver coil. In some aspects, at least a portion of a mutual inductance canceled may be caused by at least one of the first wireless field, the second wireless field, and the third wireless field. In some aspects, the canceling may be via a cancellation circuit operably coupled to the first driver coil, the second driver coil, and the third driver coil. The method further comprises sharing a common ground with the first, second, and third driver coils via the cancellation circuit.

Another aspect disclosed is a device for transmitting wireless power to a first receiver. The device may comprise means for generating a first wireless field, means for generating a second wireless field, and means for generating a third wireless field. The device may further comprise means for canceling mutual inductance operably coupled to the first wireless field generating means, the second wireless field generating means, and the third wireless field generating means. The means for canceling mutual inductance may be configured to at least partially cancel mutual inductance between the first wireless field generating means, the second wireless field generating means, and the third wireless field generating means. The first, second, and third wireless field generating means may be configured to share a common ground.

Details of one or more embodiments of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

The above-mentioned aspects, as well as other features, aspects, and advantages of the present technology will now be described in connection with various embodiments, with reference to the accompanying drawings. The illustrated embodiments, however, are merely examples and are not intended to be limiting. Throughout the drawings, similar symbols typically identify similar components, unless context dictates otherwise. Note that the relative dimensions of the following figures may not be drawn to scale.

DETAILED DESCRIPTION

The detailed description set forth below in connection with the appended drawings is intended as a description of exemplary embodiments and is not intended to represent the only embodiments in which the invention may be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments. In some instances, some devices are shown in block diagram form.

Wireless power transfer may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field or an electromagnetic field) may be received, captured by, or coupled by a "receive antenna" to achieve power transfer.

Figure 1:
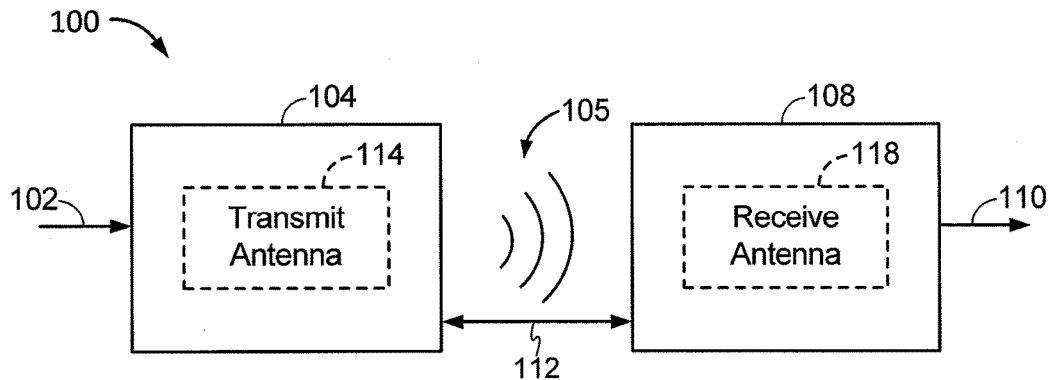
FIG. 1 is a functional block diagram of a wireless power transfer system, in accordance with an exemplary embodiment.

FIG. 1 is a functional block diagram of a wireless power transfer system 100, in accordance with one exemplary embodiment. An input power 102 may be provided to a transmitter 104 from a power source (not shown in this figure) to generate a wireless (e.g., magnetic or electromagnetic) field 105 for performing energy transfer. A receiver 108 may couple to the wireless field 105 and generate an output power 110 for storing or consumption by a device (not shown in this figure) coupled to the output power 110. Both the transmitter 104 and the receiver 108 are separated by a distance 112.

In one exemplary embodiment, the transmitter 104 and the receiver 108 are configured according to a mutual resonant relationship. When the resonant frequency of the receiver 108 and the resonant frequency of the transmitter 104 are substantially the same or very close, transmission losses between the transmitter 104 and the receiver 108 are minimal. As such, wireless power transfer may be provided over a larger distance in contrast to purely inductive solutions that may involve large antenna coils which are very close (e.g., sometimes within millimeters). Resonant inductive coupling techniques may thus allow for improved efficiency and power transfer over various distances and with a variety of inductive coil configurations.

The receiver 108 may receive power when the receiver 108 is located in the wireless field 105 produced by the transmitter 104. The wireless field 105 corresponds to a region where energy output by the transmitter 104 may be captured by the receiver 108. The wireless field 105 may correspond to the "near-field" of the transmitter 104 as will be further described below. The transmitter 104 may include a transmit antenna or coil 114 for transmitting energy to the receiver 108. The receiver 108 may include a receive antenna or coil 118 for receiving or capturing energy transmitted from the transmitter 104. The near-field may correspond to a region in which there are strong reactive fields resulting from the currents and charges in the transmit coil 114 that minimally radiate power away from the transmit coil 114. The near-field may correspond to a region that is within about one wavelength (or a fraction thereof) of the transmit coil 114.

As described above, efficient energy transfer may occur by coupling a large portion of the energy in the wireless field 105 to the receive coil 118 rather than propagating most of the energy in an electromagnetic wave to the far field. When positioned within the wireless field 105, a "coupling mode" may be developed between the transmit coil 114 and the receive coil 118. The area around the transmit antenna 114 and the receive antenna 118 where this coupling may occur is referred to herein as a coupling-mode region.

Figure 2:
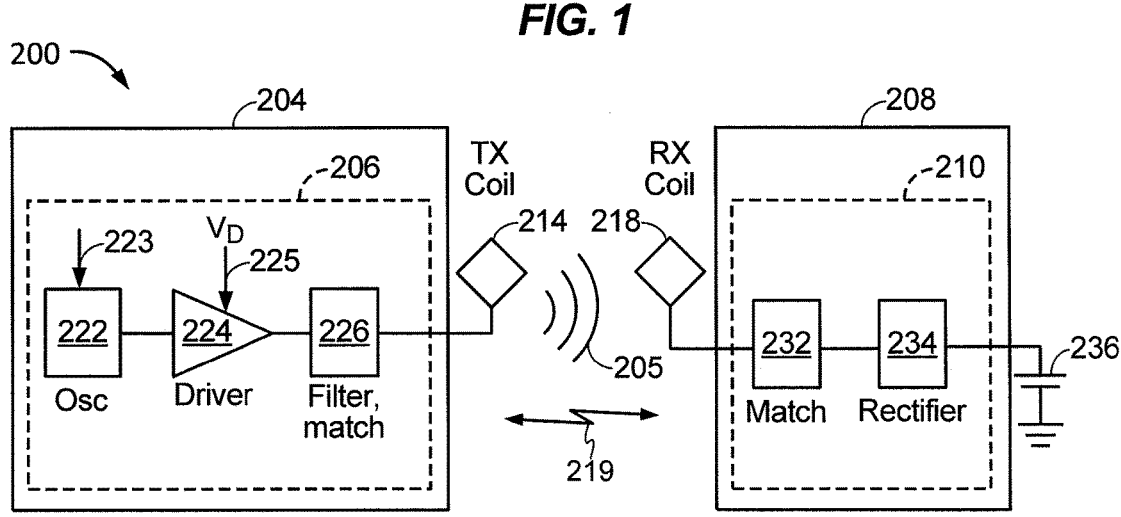
FIG. 2 is a functional block diagram of a wireless power transfer system, in accordance with an exemplary embodiment.

FIG. 2 is a functional block diagram of a wireless power transfer system 200, in accordance with another exemplary embodiment. The system 200 includes a transmitter 204 and a receiver 208. The transmitter 204 may include a transmit circuitry 206 that may include an oscillator 222, a driver circuit 224, and a filter and matching circuit 226. The oscillator 222 may be configured to generate a signal at a desired frequency that may be adjusted in response to a frequency control signal 223. The oscillator 222 may provide the oscillator signal to the driver circuit 224. The driver circuit 224 may be configured to drive the transmit antenna 214 at, for example, a resonant frequency of the transmit antenna 214 based on an input voltage signal (VD) 225. The driver circuit 224 may be a switching amplifier configured to receive a square wave from the oscillator 222 and output a sine wave.

The filter and matching circuit 226 may filter out harmonics or other unwanted frequencies and match the impedance of the transmitter 204 to the transmit antenna 214. As a result of driving the transmit antenna 214, the transmit antenna 214 may generate a wireless field 205 to wirelessly output power at a level sufficient for charging a battery 236.

The receiver 208 may include a receive circuitry 210 that may include a matching circuit 232 and a rectifier circuit 234. The matching circuit 232 may match the impedance of the receive circuitry 210 to the receive antenna 218. The rectifier circuit 234 may generate a direct current (DC) power output from an alternate current (AC) power input to charge the battery 236, as shown in FIG. 2. The receiver 208 and the transmitter 204 may additionally communicate on a separate communication channel 219 (e.g., Bluetooth, Zigbee, cellular, etc.). The receiver 208 and the transmitter 204 may alternatively communicate via in-band signaling using characteristics of the wireless field 205.

The receiver 208 may be configured to determine whether an amount of power transmitted by the transmitter 204 and received by the receiver 208 is appropriate for charging the battery 236. Transmitter 204 may be configured to generate a predominantly non-radiative field with a direct field coupling coefficient (k) for providing energy transfer. Receiver 208 may directly couple to the wireless field 205 and may generate an output power for storing or consumption by a battery (or load) 236 coupled to the output or receive circuitry 210.

As discussed above, both transmitter 204 and receiver 208 are separated by a distance and may be configured according to a mutual resonant relationship to minimize transmission losses between the transmitter 204 and the receiver 208. When the transmit antenna 214 and the receive antenna 218 are mutually resonant and in close proximity, the wireless power transfer system 200 may be described as a strongly coupled regime where the coupling coefficient (coupling coefficient k) is typically above 0.3. In some embodiments, the coupling coefficient k between the transmitter 204 and receiver 208 may vary based on at least one of the distance between the two corresponding antennas or the size of the corresponding antennas, etc.

Figure 3:
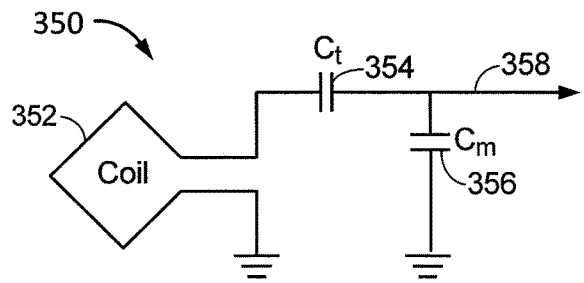
FIG. 3 is a schematic diagram of a portion of transmit circuitry or receive circuitry of FIG. 2 including a transmit or receive antenna, in accordance with an exemplary embodiment.

FIG. 3 is a schematic diagram of a portion of the transmit circuitry 206 or the receive circuitry 210 of FIG. 2, in accordance with exemplary embodiments. As illustrated in FIG. 3, a transmit or receive circuitry 350 may include an antenna 352. The antenna 352 may also be referred to or be configured as a "loop" antenna 352. The antenna 352 may also be referred to herein or be configured as a "magnetic" antenna or an induction coil. The term "antenna" generally refers to a component that may wirelessly output or receive energy for coupling to another "antenna." The antenna may also be referred to as a coil of a type that is configured to wirelessly output or receive power. As used herein, the antenna 352 is an example of a "power transfer component" of a type that is configured to wirelessly output and/or receive power.

The antenna 352 may include an air core or a physical core such as a ferrite core (not shown in this figure).

As stated, efficient transfer of energy between the transmitter 104 (transmitter 204 as referenced in FIG. 2) and the receiver 108 (receiver 208 as referenced in FIG. 2) may occur during matched or nearly matched resonance between the transmitter 104 and the receiver 108. However, even when resonance between the transmitter 104 and receiver 108 are not matched, energy may be transferred, although the efficiency may be affected. For example, the efficiency may be less when resonance is not matched. Transfer of energy occurs by coupling energy from the wireless field 105 (wireless field 205 as referenced in FIG. 2) of the transmit coil 114 (transmit coil 214 as referenced in FIG. 2) to the receive coil 118 (receive coil 218 as referenced in FIG. 2), residing in the vicinity of the wireless field 105, rather than propagating the energy from the transmit coil 114 into free space.

The resonant frequency of the loop or magnetic antennas is based on the inductance and capacitance. Inductance may be simply the inductance created by the antenna 352, whereas, capacitance may be added to the antenna's inductance to create a resonant structure at a desired resonant frequency. As a non-limiting example, a capacitor 354 and a capacitor 356 may be added to the transmit or receive circuitry 350 to create a resonant circuit that selects a signal 358 at a resonant frequency. Accordingly, for larger diameter antennas, the size of capacitance needed to sustain resonance may decrease as the diameter or inductance of the loop increases.

Furthermore, as the diameter of the antenna increases, the efficient energy transfer area of the near-field may increase. Other resonant circuits formed using other components are also possible. As another non-limiting example, a capacitor may be placed in parallel between the two terminals of the circuitry 350. For transmit antennas, the signal 358, with a frequency that substantially corresponds to the resonant frequency of the antenna 352, may be an input to the antenna 352.

In FIG. 1, the transmitter 104 may output a time varying magnetic (or electromagnetic) field with a frequency corresponding to the resonant frequency of the transmit coil 114. When the receiver 108 is within the wireless field 105, the time varying magnetic (or electromagnetic) field may induce a current in the receive coil 118. As described above, if the receive coil 118 is configured to resonate at the frequency of the transmit coil 114, energy may be efficiently transferred. The AC signal induced in the receive coil 118 may be rectified as described above to produce a DC signal that may be provided to charge or to power a load.

Figure 4:
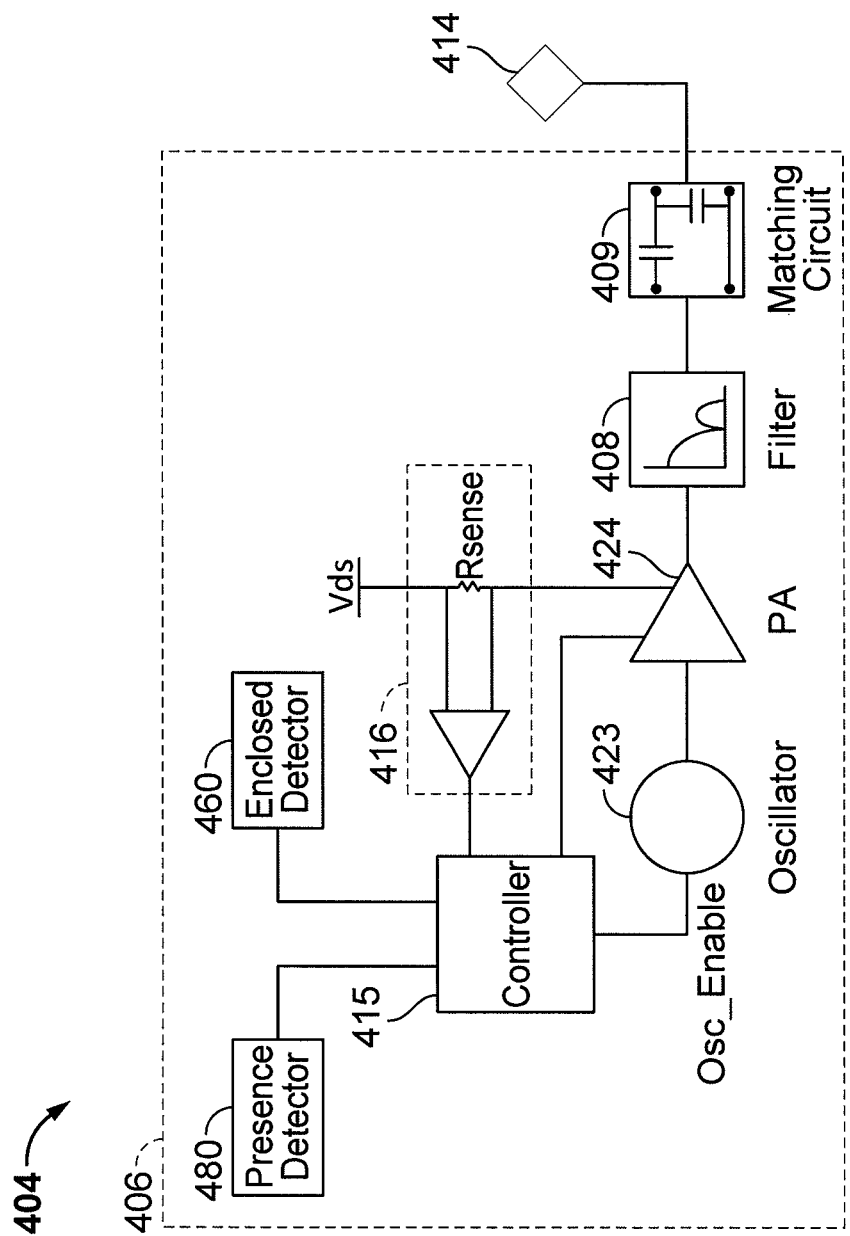
FIG. 4 is a functional block diagram of a transmitter that can be used in the wireless power transfer system of FIG. 1, in accordance with an exemplary embodiment.

FIG. 4 is a functional block diagram of a transmitter 404 that can be used in the wireless power transfer system of FIG. 1, in accordance with exemplary embodiments of the invention. The transmitter 404 can include transmit circuitry 406 and a transmit coil 414. The transmit coil 414 can be the coil 352 as shown in FIG. 3. Transmit circuitry 406 can provide RF power to the transmit coil 414 by providing an oscillating signal resulting in generation of energy (e.g., magnetic flux) about the transmit coil 414. Transmitter 404 can operate at any suitable frequency. By way of example, transmitter 404 can operate at the 13.56 MHz ISM band.

The transmit circuitry 406 can include a fixed impedance matching circuit 409 for presenting a load to the driver circuit 424 such that the efficiency of power transfer from DC to AC is increased or maximized. The transmit circuitry 406 can further include a low pass filter (LPF) 408 configured to reduce harmonic emissions to levels to prevent self-jamming of devices coupled to receivers 108 (FIG. 1). Other exemplary embodiments can include different filter topologies, including but not limited to, notch filters that attenuate specific frequencies while passing others and can include an adaptive impedance match, that can be varied based on measurable transmit metrics, such as output power to the transmit coil 414 or DC current drawn by the driver circuit 424. Transmit circuitry 406 further includes a driver circuit 424 configured to drive an RF signal as determined by an oscillator 423. The transmit circuitry 406 can be comprised of discrete devices or circuits, or alternately, can be comprised of an integrated assembly. An exemplary RF power output from transmit coil 414 can be around 1 Watt-10 Watts, such as around 2.5 Watts.

Transmit circuitry 406 can further include a controller 415 for selectively enabling the oscillator 423 during transmit phases (or duty cycles) for specific receivers, for adjusting the frequency or phase of the oscillator 423, and for adjusting the output power level for implementing a communication protocol for interacting with neighboring devices through their attached receivers. It is noted that the controller 415 can also be referred to herein as processor 415. Adjustment of oscillator phase and related circuitry in the transmission path can allow for reduction of out of band emissions, especially when transitioning from one frequency to another.

The transmit circuitry 406 can further include a load sensing circuit 416 for detecting the presence or absence of active receivers in the vicinity of the near-field generated by transmit coil 414. By way of example, a load sensing circuit 416 monitors the current flowing to the driver circuit 424, that can be affected by the presence or absence of active receivers in the vicinity of the field generated by transmit coil 414 as will be further described below. Detection of changes to the loading on the driver circuit 424 are monitored by controller 415 for use in determining whether to enable the oscillator 423 for transmitting energy and to communicate with an active receiver. As described more fully below, a current measured at the driver circuit 424 can be used to determine whether an invalid device is positioned within a wireless power transfer region of the transmitter 404.

The transmit coil 414 can be implemented with a Litz wire or as an antenna strip with the thickness, width and metal type selected to keep resistive losses low. In one embodiment, the transmit coil 414 can generally be configured for association with a larger structure such as a table, mat, lamp or other less portable configuration. Accordingly, the transmit coil 414 generally may not need "turns" in order to be of a practical dimension. An exemplary embodiment of a transmit coil 414 can be "electrically small" (i.e., fraction of the wavelength) and tuned to resonate at lower usable frequencies by using capacitors to define the resonant frequency.

The transmitter 404 can gather and track information about the whereabouts and status of receiver devices that can be associated with the transmitter 404. Thus, the transmit circuitry 406 can include a presence detector 480, an enclosed detector 460, or a combination thereof, connected to the controller 415 (also referred to as a processor herein). The controller 415 can adjust an amount of power delivered by the driver circuit 424 in response to presence signals from the presence detector 480 and the enclosed detector 460. The transmitter 404 can receive power through a number of power sources, such as, for example, an AC-DC converter (not shown) to convert conventional AC power present in a building, a DC-DC converter (not shown) to convert a conventional DC power source to a voltage suitable for the transmitter 404, or directly from a conventional DC power source (not shown).

As a non-limiting example, the presence detector 480 can be a motion detector utilized to sense the initial presence of a device to be charged that is inserted into the coverage area of the transmitter 404. After detection, the transmitter 404 can be turned on and the RF power received by the device can be used to toggle a switch on the RX device in a pre-determined manner, which in turn results in changes to the driving point impedance of the transmitter 404.

As another non-limiting example, the presence detector 480 can be a detector capable of detecting a human, for example, by infrared detection, motion detection, or other suitable means. In some exemplary embodiments, there can be regulations limiting the amount of power that a transmit coil 414 can transmit at a specific frequency. In some cases, these regulations are meant to protect humans from electromagnetic radiation. However, there can be environments where a transmit coil 414 is placed in areas not occupied by humans, or occupied infrequently by humans, such as, for example, garages, factory floors, shops, and the like. If these environments are free from humans, it can be permissible to increase the power output of the transmit coil 414 above the normal power restrictions regulations. In other words, the controller 415 can adjust the power output of the transmit coil 414 to a regulatory level or lower in response to human presence and adjust the power output of the transmit coil 414 to a level above the regulatory level when a human is outside a regulatory distance from the electromagnetic field of the transmit coil 414.

As a non-limiting example, the enclosed detector 460 (can also be referred to herein as an enclosed compartment detector or an enclosed space detector) can be a device such as a sense switch for determining when an enclosure is in a closed or open state. When a transmitter is in an enclosure that is in an enclosed state, a power level of the transmitter can be increased.

In exemplary embodiments, a method by which the transmitter 404 does not remain on indefinitely can be used. In this case, the transmitter 404 can be programmed to shut off after a user-determined amount of time. This feature prevents the transmitter 404, notably the driver circuit 424, from running long after the wireless devices in its perimeter are fully charged. This event can be due to the failure of the circuit to detect the signal sent from either the repeater or the receive coil that a device is fully charged. To prevent the transmitter 404 from automatically shutting down if another device is placed in its perimeter, the transmitter 404 automatic shut off feature can be activated only after a set period of lack of motion detected in its perimeter. The user can be able to determine the inactivity time interval, and change it as desired. As a non-limiting example, the time interval can be longer than that needed to fully charge a specific type of wireless device under the assumption of the device being initially fully discharged.

Figure 5:
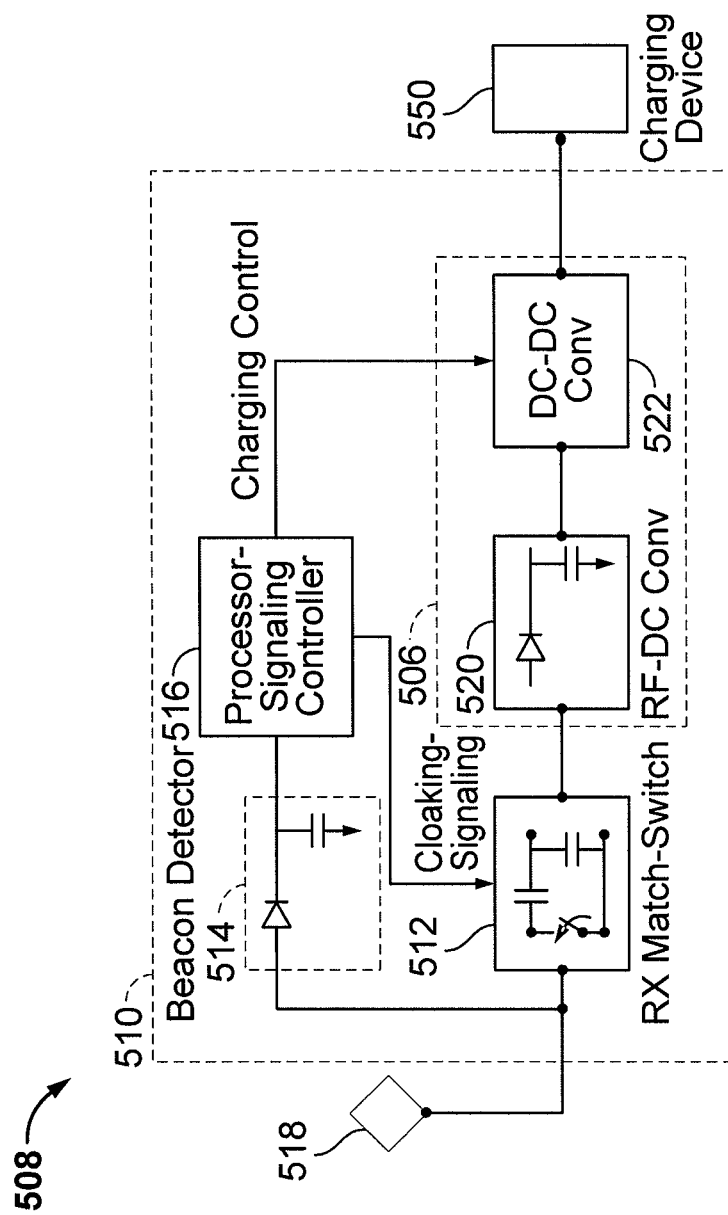
FIG. 5 is a functional block diagram of a receiver that can be used in the wireless power transfer system of FIG. 1, in accordance with an exemplary embodiment.

FIG. 5 is a functional block diagram of a receiver 508 that can be used in the wireless power transfer system of FIG. 1, in accordance with exemplary embodiments of the invention. The receiver 508 includes receive circuitry 510 that can include a receive coil 518. Receiver 508 further couples to device 550 for providing received power thereto. It should be noted that receiver 508 is illustrated as being external to device 550 but can be integrated into device 550. Energy can be propagated wirelessly to receive coil 518 and then coupled through the rest of the receive circuitry 510 to device 550. By way of example, the charging device can include devices such as mobile phones, portable music players, laptop computers, tablet computers, computer peripheral devices, communication a devices (e.g., Bluetooth devices), digital cameras, hearing aids (and other medical devices), and the like.

Receive coil 518 can be tuned to resonate at the same frequency, or within a specified range of frequencies, as transmit coil 414 (FIG. 4). Receive coil 518 can be similarly dimensioned with transmit coil 414 or can be differently sized based upon the dimensions of the associated device 550. By way of example, device 550 can be a portable electronic device having diametric or length dimension smaller than the diameter or length of transmit coil 414. In such an example, receive coil 518 can be implemented as a multi-turn coil in order to reduce the capacitance value of a tuning capacitor (not shown) and increase the receive coil's impedance. By way of example, receive coil 518 can be placed around the substantial circumference of device 550 in order to maximize the coil diameter and reduce the number of loop turns (i.e., windings) of the receive coil 518 and the inter-winding capacitance.

Receive circuitry 510 can provide an impedance match to the receive coil 518. Receive circuitry 510 includes power conversion circuitry 506 for converting a received RF energy source into charging power for use by the device 550. Power conversion circuitry 506 includes an RF-to-DC converter 520 and can also in include a DC-to-DC converter 522. RF-to-DC converter 520 rectifies the RF energy signal received at receive coil 518 into a non-alternating power with an output voltage represented by Vrect. The DC-to-DC converter 522 (or other power regulator) converts the rectified RF energy signal into an energy potential (e.g., voltage) that is compatible with device 550 with an output voltage and output current represented by Vout and Iout. Various RF-to-DC converters are contemplated, including partial and full rectifiers, regulators, bridges, doublers, as well as linear and switching converters.

Receive circuitry 510 can further include switching circuitry 512 for connecting receive coil 518 to the power conversion circuitry 506 or alternatively for disconnecting the power conversion circuitry 506. Disconnecting receive coil 518 from power conversion circuitry 506 not only suspends charging of device 550, but also changes the "load" as "seen" by the transmitter 404 (FIG. 2).

As disclosed above, transmitter 404 includes load sensing circuit 416 that can detect fluctuations in the bias current provided to transmitter driver circuit 424. Accordingly, transmitter 404 has a mechanism for determining when receivers are present in the transmitter's near-field.

In some embodiments, a receiver 508 can be cloaked in order to eliminate coupling to other nearby receivers or to reduce loading on nearby transmitters. This "unloading" of a receiver is also known herein as a "cloaking." Furthermore, this switching between unloading and loading controlled by receiver 508 and detected by transmitter 404 can provide a communication mechanism from receiver 508 to transmitter 404 as is explained more fully below. Additionally, a protocol can be associated with the switching that enables the sending of a message from receiver 508 to transmitter 404. By way of example, a switching speed can be on the order of 100 μsec.

In an exemplary embodiment, communication between the transmitter 404 and the receiver 508 refers to a device sensing and charging control mechanism, rather than conventional two-way communication (i.e., in band signaling using the coupling field). In other words, the transmitter 404 can use on/off keying of the transmitted signal to adjust whether energy is available in the near-field. The receiver can interpret these changes in energy as a message from the transmitter 404. From the receiver side, the receiver 508 can use tuning and de-tuning of the receive coil 518 to adjust how much power is being accepted from the field. In some cases, the tuning and de-tuning can be accomplished via the switching circuitry 512. The transmitter 404 can detect this difference in power used from the field and interpret these changes as a message from the receiver 508. It is noted that other forms of modulation of the transmit power and the load behavior can be utilized.

Receive circuitry 510 can further include signaling detector and beacon circuitry 514 used to identify received energy fluctuations, that can correspond to informational signaling from the transmitter to the receiver. Furthermore, signaling and beacon circuitry 514 can also be used to detect the transmission of a reduced RF signal energy (i.e., a beacon signal) and to rectify the reduced RF signal energy into a nominal power for awakening either un-powered or power-depleted circuits within receive circuitry 510 in order to configure receive circuitry 510 for wireless charging.

Receive circuitry 510 further includes processor 516 for coordinating the processes of receiver 508 described herein including the control of switching circuitry 512 described herein. Cloaking of receiver 508 can also occur upon the occurrence of other events including detection of an external wired charging source (e.g., wall/USB power) providing charging power to device 550. Processor 516, in addition to controlling the cloaking of the receiver, can also monitor signaling detector and beacon circuitry 514 to determine a beacon state and extract messages sent from the transmitter 404. Processor 516 can also adjust the DC-to-DC converter 522 for improved performance.

Figure 6:
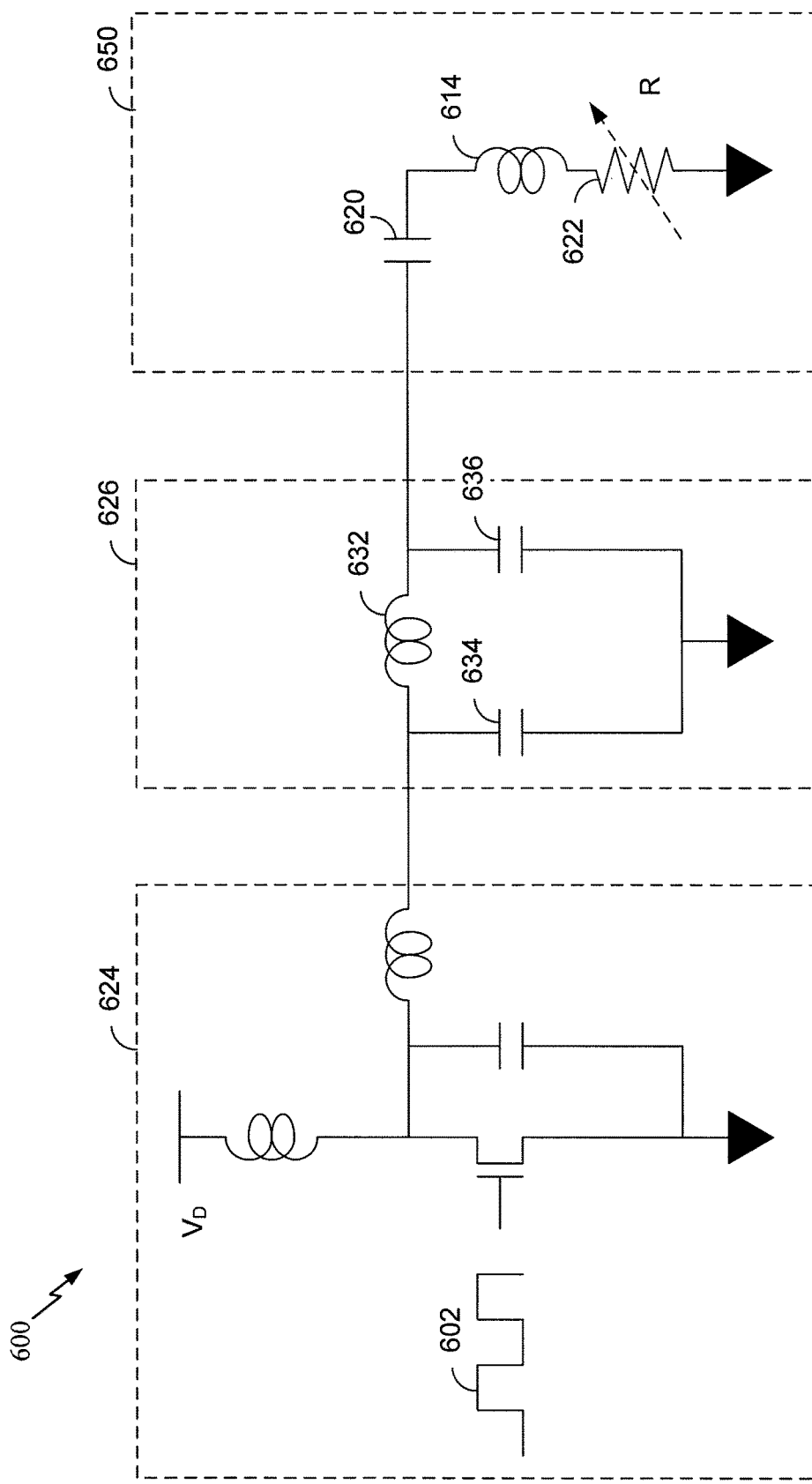
FIG. 6 is a schematic diagram of a portion of transmit circuitry that can be used in the transmitter of FIG. 4.

FIG. 6 is a schematic diagram of a portion of transmit circuitry 600 that can be used in the transmit circuitry 406 of FIG. 4. The transmit circuitry 600 can include a driver circuit 624 as described above in FIG. 4. As described above, the driver circuit 624 can be a switching amplifier that can be configured to receive a square wave and output a sine wave to be provided to the transmit circuit 650. In some cases, the driver circuit 624 can be referred to as an amplifier circuit. The driver circuit 624 is shown as a class E amplifier; however, any suitable driver circuit 624 can be used in accordance with embodiments of the invention. The driver circuit 624 can be driven by an input signal 602 from an oscillator 423 as shown in FIG. 4. The driver circuit 624 can also be provided with a drive voltage VD that is configured to control the maximum power that can be delivered through a transmit circuit 650. To eliminate or reduce harmonics, the transmit circuitry 600 can include a filter circuit 626. In some embodiments, the filter circuit 626 can be a three pole (capacitor 634, inductor 632, and capacitor 636) low pass filter circuit 626.

The signal output by the filter circuit 626 can be provided to a transmit circuit 650 comprising a coil 614. The transmit circuit 650 can include a series resonant circuit having a capacitance 620 and inductance that can resonate at a frequency of the filtered signal provided by the driver circuit 624. In various embodiments, the coil or an additional capacitor component can create the inductance or capacitance. The load of the transmit circuit 650 can be represented by the variable resistor 622. The load can be a function of a wireless power receiver 508 that is positioned to receive power from the transmit circuit 650.

In various embodiments, the wireless power transmission system 100, described above with respect to FIGS. 1-6, can vary a wireless power transmission based on detection of a nearby object. The nearby object can include an intended receiver, a device to be charged, and/or a foreign object. A foreign object can be something other than an intended transmission target (i.e., a non-charging device) such as, for example, a parasitic receiver, an inorganic object, or a living object (such as a human, animal, etc.). A parasitic receiver can include, for example, a non-electronic metallic object, an unauthorized chargeable device, etc.

For example, as discussed above with respect to FIG. 4, the transmitter 404 can include the presence detector 480, which can detect the presence, distance, orientation, and/or location of the nearby object. In various other embodiments, the presence detector 480 can be located in another location such as, for example, on the receiver 508, or elsewhere. The controller 415 can reduce transmission power when a foreign object is detected within a first distance. In various embodiments, the wireless power transmission system 100 can adjust a characteristic of the wireless power transmission in accordance with rules or regulations regarding biological safety, fire safety, etc. For example, the wireless power transmission system 100 can adjust the transmit power such that the electromagnetic field reaching a nearby human body is below a threshold, given the distance to the human body.

Referring back to FIG. 2, in certain embodiments, the wireless power transfer system 200 can include a plurality of receivers 208. In one embodiment, the size of the TX coil 214 is fixed. Accordingly, the transmitter 204 may not be well matched to different sized RX coils 218. For a variety of reasons, it can be desirable for the transmitter 204 to use a plurality of TX coils 214. In some embodiments, the plurality of TX coils 214 can be arranged in an array. In some embodiments, the array can be modular. In some embodiments, the array can include TX coils 214 of the same, or substantially the same, size.

In various embodiments, each TX coil 214 can be independently activated, based on the location of the receivers 208 and/or the size of their RX coils 218. For example, a single TX coil 214 can provide wireless power to nearby receivers 208 having relatively small RX coils 218. On the other hand, multiple TX coils 214 can be provide wireless power to nearby receivers having relatively large RX coils 218. TX coils 214 that are not near RX coils 218 can be deactivated.

In some embodiments, the plurality of TX coils 214 can form a large transmit area. The transmit area can be scalable, covering a larger area using additional TX coils 214. The TX coils 214 can allow for free positioning of devices over a large area. Moreover, they can be configured to simultaneously charge a plurality of receivers 208. In some embodiments, individual TX coils 214 can couple to each other. TX coils 214 that are coupled can result, for example, in one power amplifier driving power into an adjacent amplifier. Accordingly, coupled TX coils 214 can cause amplifier instability and/or damage. It can be desirable for the wireless power transfer system 100 to include methods, systems, and/or apparatuses for reducing or eliminating mutual coupling/inductance between TX coils 214 in close proximity with each other that are active concurrently.

Figure 7A:
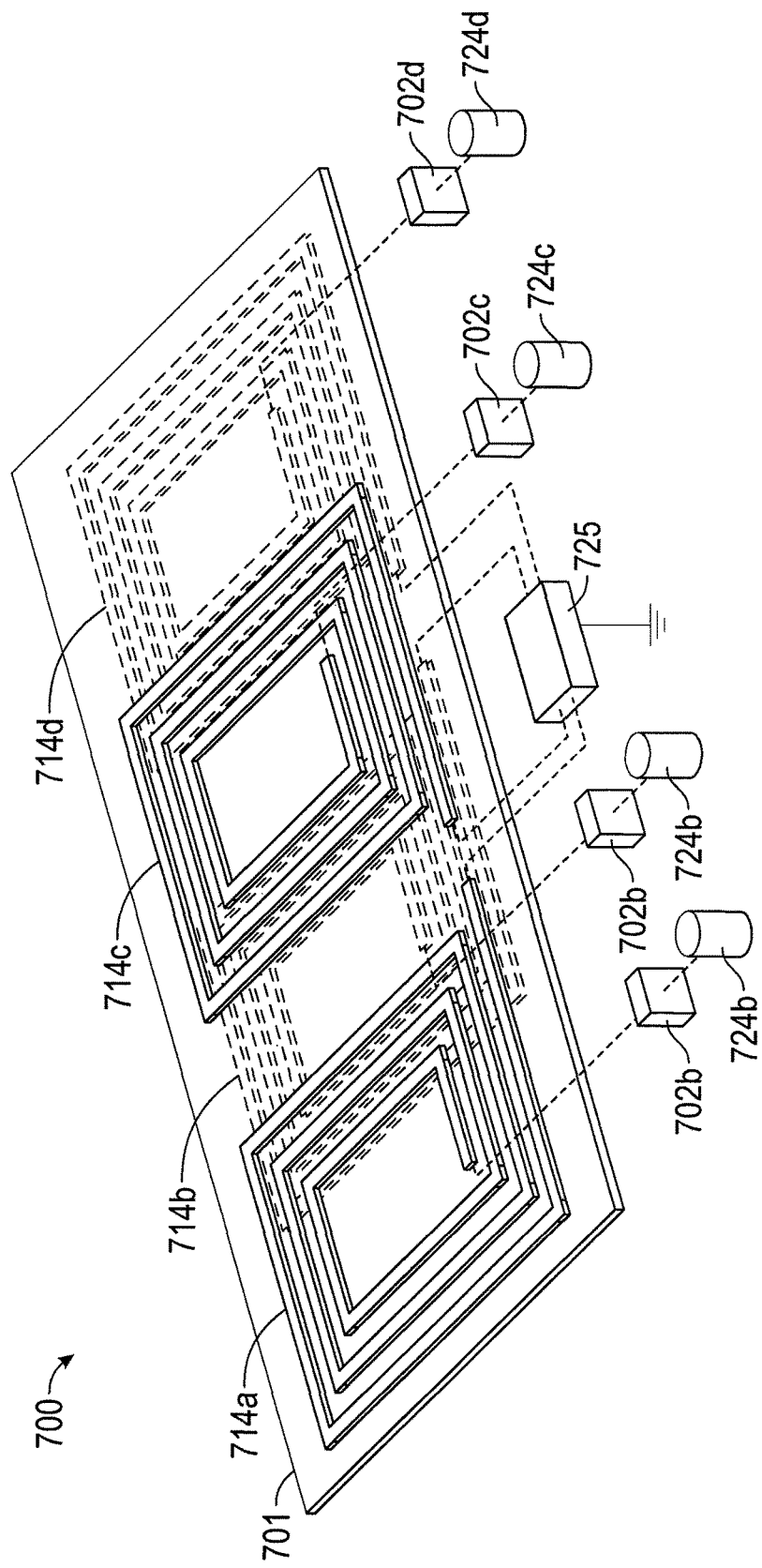
FIG. 7a is a perspective view of a transmit area without a mutual inductance cancellation circuit, in accordance with an exemplary embodiment.

FIG. 7a is a perspective view of an exemplary transmit area 700 in accordance with an exemplary embodiment. As shown, the transmit area 700 includes four transmit circuits (not individually labeled). The transmit circuits of transmit area 700 may comprise the transmitters and/or transmit circuitry described above in relation to FIGS. 1-6, each comprising components (e.g., coils, amplifiers, resonant components) described above. As described above in relation to FIG. 4, the transmit circuits in the transmit area 700 may comprise a first power amplifier (PA) 724a, a second PA 724b, a third PA 724c, and a fourth PA 724d. The PAs 724a-724d may correspond to the amplifiers or drivers 424 of FIG. 4. The PAs 724a-724d are connected to respective resonant capacitors 702a-702d, which may correspond to the resonant capacitors 354/356 of FIG. 3. The transmit area 700 further includes a first transmit coil 714a, a second transmit coil 714b, a third transmit coil 714c, and a fourth transmit coil 714d and a common ground 725 to which all the transmit coils 714a-714d connect. The transmit coils 714a-714d may correspond to the transmit coil 414 of FIG. 4. Thus, the first end of the transmit coils 714a-714d are connected to their respective PAs 724a-724d and the second end of the transmit coils 714a-714d are connected to the common ground 725. Although the transmit area 700 depicted in FIG. 7a includes four transmit circuits, in other embodiments, more or fewer transmit circuits (and their associated components) may be included in the transmit area 700. As depicted, the pair of transmit coils 714a and 714c may be disposed in a common plane different than the pair of transmit coils 714b and 714d. In some embodiments, the common ground 725 may be shared with the PAs 724a-724d.

The transmit coils 714a-714d are shown as being rectangular; however, in some embodiments, the transmit coils 714a-714d may be of any other shape (e.g., triangular, circular, hexagonal, etc.). In some embodiments, the transmit coils 714a-714d may form an array of transmit coils, wherein each transmit coil 714a-714d is positioned substantially adjacent to the other transmit coils 714a-714d of the transmit area 700. In some embodiments, the transmit coils 714a-714d may be positioned in an overlapping manner, wherein each of the transmit coils 714a-714d may overlap with one or more other transmit coils 714a-714d in the transmit area 700. Additionally, the transmit coils 714a-714d depicted in FIG. 7a are multi-turn coils. However, in other embodiments, the transmit coils 714a-714d may be single turn coils and may be either single- or multi-layer coils. In some embodiments, the transmit coils 714a-714d may have inductances of 2000 nH. In other embodiments, the transmit coils 714a-714d may have inductances greater than or less than 2000 nH. In other embodiments, each of the transmit coils 714a-714d may have inductances of different values, or various combinations of transmit coils 714a-714d may share inductances of different values.

As described above, each of the PAs 724a-724d and transmit coils 714a-714d may form individual transmit circuits, wherein none of the transmit circuits may be connected at any point except for at the common ground 725. The transmit circuits serve to generate a wireless field (not shown) to transmit power and/or communications wirelessly to one or more receivers or receive circuits (not shown). Though not shown in this figure, each of the transmit circuits may include resonant capacitors. As discussed above, as depicted in FIG. 7a, the pair of transmit coils 714a and 714c may be disposed in a first plane while the pair of transmit coils 714b and 714d may be disposed in a second plane different from the first plane. In other embodiments, certain of the four transmit coils 714a-714d of the transmit circuits may be disposed on the same or opposite sides of a circuit board (i.e., the first plane may be a front side of the circuit board and the second plane may be the back side of a circuit board). In some embodiments, the circuit board may comprise a printed circuit board (PCB 701). In some embodiments, the four transmit coils 714a-714d may be disposed on the same side of the PCB 701. In some other embodiments, pairs of the transmit coils 714a-714d may be disposed on opposite sides of the PCB 701. For example, transmit coils 714a and 714c may be on one side of the PCB 701, while transmit coils 714b and 714d may be on the opposite side of the PCB 701. While the four transmit coils 714a-714d of the transmit circuits depicted are shown substantially located in one of two planes (i.e., opposite sides of the PCB 701) in relation to one another, in other embodiments, the transmit coils 714a-714d of the transmit circuits may be disposed in more or fewer planes (or layers) in relation to one another.

The transmit circuits may each be configured to generate a wireless field by the associated transmit coils 714a-714d based on a signal generated by the PAs 724a-724d, as discussed above in relation to FIG. 4. However, when the transmit circuits are in close proximity with other transmit circuits (i.e., the transmit coil 714a from one transmit circuit is in close proximity with the transmit coil 714b from another transmit circuit), a mutual inductance (due to a mutual coupling between each pair of transmit coils 714a-714d) may be generated between the transmit coils 714a-714d. The mutual inductance may be the affect that one inductor, here the transmit coil 714a, may have on another inductor, e.g., transmit coil 714b, and vice versa. The mutual inductance between the transmit coils 714a-714d in close proximity with other transmit coils 714a-714d may have adverse effects on the efficiency and field uniformity across the array of transmit coils 714a-714d. The amount of mutual inductance between two transmit coils of the transmit coils 714a-714d may correspond at least in part to the size of the transmit coils 714a-714d and/or the location of the transmit coils 714a-714d in relation to each other. For example, the two overlapping transmit coils 714a and 714b may have a positive mutual inductance because magnetic fields from both of the transmit coils 714a and 714b may pass through the centers of both the transmit coils 714a and 714b in the same direction. Two adjacent transmit coils, for example transmit coils 714a and 714c, may have a negative mutual inductance because the magnetic fields from the transmit coils 714a and 714c may pass through the respective centers of the transmit coils 714a and 714c in opposite directions.

Figure 7B:
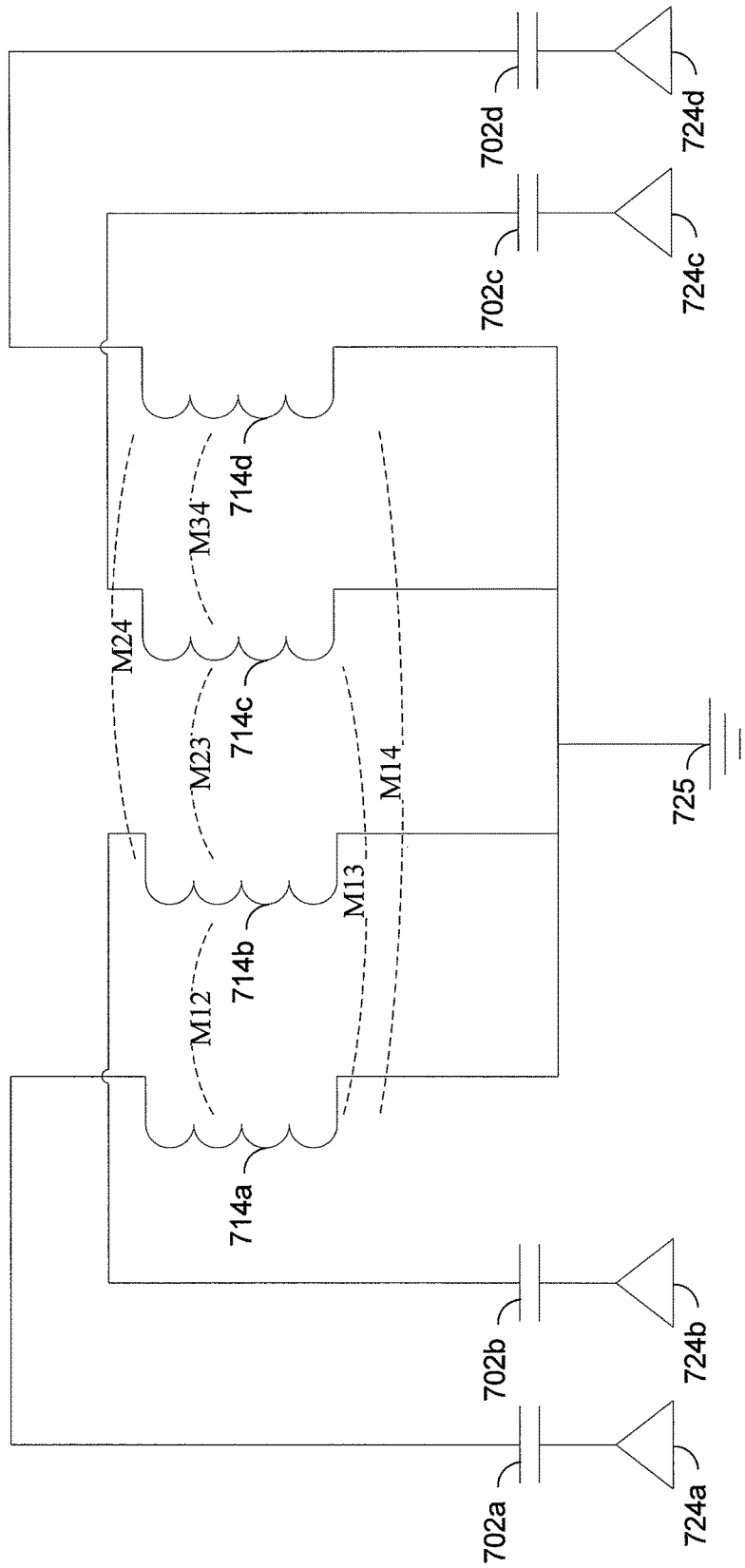
FIG. 7b depicts a schematic diagram of the exemplary transmit area, in accordance with an exemplary embodiment.

FIG. 7b depicts a schematic diagram of the exemplary transmit area 700, in accordance with an exemplary embodiment. As depicted in FIG. 7a, the transmit area 700 may comprise multiple transmit coils 714a-714d, each having individual and isolated PAs 724a-724d and without any mutual inductance cancellation circuit or circuitry. As shown in FIG. 7b, there are four individual transmit circuits. The four transmit circuits may each comprise one of transmit coils 714a-714d, each of the transmit coils 714a-714d connected to a PA 724a-724d, respectively, with a resonant capacitor 702a-702d between the power amplifiers 724a-724d and the respective transmit coils 714a-714d. Resonant capacitors 702a-702d may include one or more of capacitors 354, 357, and/or 620 described above to create a resonant circuit. On the opposite end of the transmit coils 714a-714d, each of the transmit coils 714a-714d has a return that is connected directly to a common ground 725. Thus, each of the transmit coils 714a-714d is connected to each other transmit coil 714a-724d at the ground 725.

As discussed above with regards to FIG. 2, coupling between the transmit and receive antennas 214 and 218, respectively, may exist and be related to a coupling coefficient or coupling coefficient (k). The value of the coupling coefficient may vary from −1 to 1. The mutual inductance between two coils may be calculated using Equation 1 below:

$$M = K * \text{square root of } (L1*L2) \quad \text{(Equation 1)}$$

In relation to FIGS. 7a and 7b, the mutual inductances may be generated between adjacent or overlapping transmit coils 714a-714d when one or more of the adjacent transmit coils 714a-714d is activated (generating a wireless field) with a fluctuating/varying current. For example, mutual inductance M12 may represent the mutual inductance created between transmit coils 714a and 714b when at least one of the two transmit coils 714a-714b are active. Similarly, mutual inductance M23 may represent the mutual inductance created between transmit coils 714b and 714c, while mutual inductance M13 may represent the mutual inductance between transmit coils 714a and 714c. Mutual inductance M34 may represent the mutual inductance generated between transmit coils 714c and 714d when at least one of the transmit coils 714c and 714d have current flow through them. Mutual inductance M14 represents the mutual inductance generated during operation of one or more of transmit coils 714a and 714d, while mutual inductance M24 represents the mutual inductance that is generated between transmit coils 714b and 714d.

As discussed above and as shown in example values in Table 1 below in light of the components shown in FIG. 7b, the coupling coefficients associated with the mutual inductances between the various combinations of transmit coils 714a-714d may vary based on distance between the two of the transmit coils 714a-714d when the transmit coils 714a-714d are each of approximately the same size. The coupling coefficient (k) values shown below may be based off a wireless power transfer system 100 comprising transmit coils 714a-714d having inductances of 2000 nH and resonant capacitors 702a-702d having capacitances of 276 pF. In some embodiments, any of these inductances or capacitances may be of a different value and cause the mutual coupling coefficient value (k) to change.

TABLE 1

| Transmit Coil Combination | Mutual Inductance Coupling Coefficient (k) Value |
| --- | --- |
| 714a-714b | .024 |
| 714a-714c | .035 |
| 714a-714d | .0085 |
| 714b-714c | .018 |
| 714b-714d | .035 |
| 714c-714d | .022 |

These mutual inductances coupling coefficients between the adjacent transmit coils 714a-714d may correspond to the mutual inductances between the indicated transmit coil 714a-714d combinations as shown in the example values in Table 2 below.

TABLE 2

| Transmit Coil Combination | Mutual Inductance Value |
| --- | --- |
| 714a-714b | 48 |
| 714a-714c | −70 |
| 714a-714d | −17 |
| 714b-714c | 36 |
| 714b-714d | −70 |
| 714c-714d | 44 |

Figure 7C:
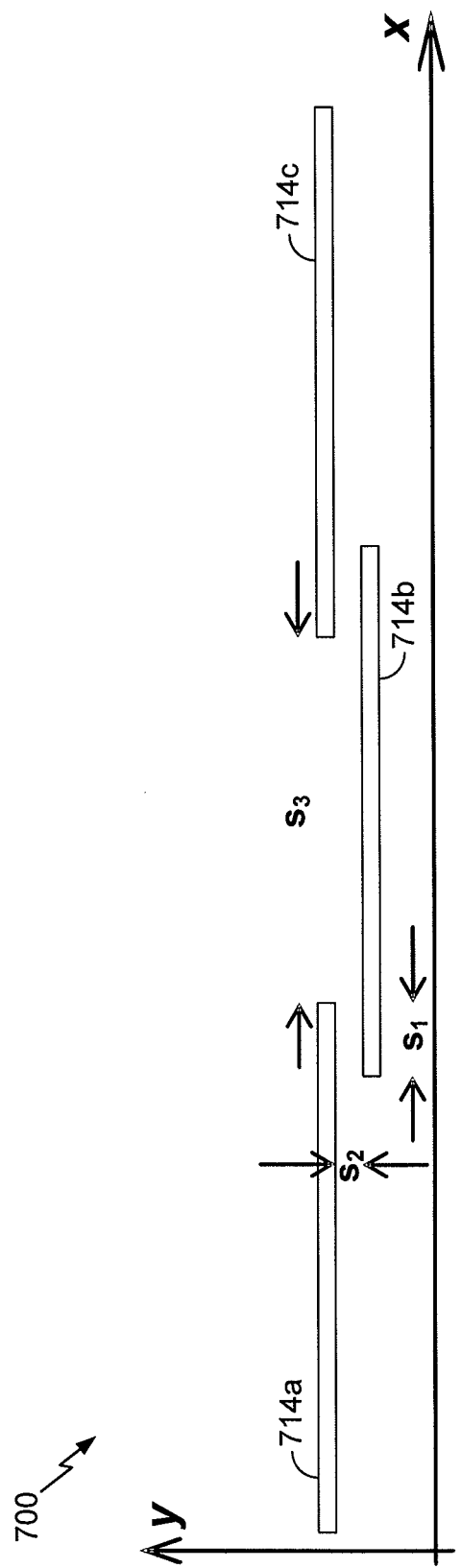
FIG. 7c depicts a horizontal view of a layout of the transmit coils in relation with one another, in accordance with an exemplary embodiment.

FIG. 7c depicts a horizontal view of a layout of the transmit coils 714a-714c of transmit area 700 in relation with one another, in accordance with an exemplary embodiment. As shown in FIG. 7c, the transmit area 700 includes the transmit coils 714a, the transmit coil 714b, and a transmit coil 714c. The two transmit coils 714a and 714b are shown in an overlapping layout (i.e., wherein at least a portion of the transmit coil 714a overlaps with at least a portion of the transmit coils 714b), while transmit coils 714b and 714c also overlap. Distance $s_1$ depicts the amount of overlap between the two transmit coils 714a and 714b. Distance $s_2$ depicts the distance between the two overlapping transmit coils 714a and 714b in the y direction, which may represent the height difference between the two overlapping transmit coils 714a and 714b when they overlap in a horizontal direction. In some embodiments, the distance $s_2$ may correspond to the thickness of the PCB 701 when the transmit coils 714a and 714b are disposed on opposite sides of the PCB 701. The distance $s_1$ of overlap may be a variable distance based on the size of the two transmit coils 714a and 714b. The distance $s_2$ of overlap may be a variable distance based on a thickness of a substrate on which the two transmit coils 714a and 714b may be installed (i.e., the printed circuit board (PCB 701)). A receiver (not shown) may be placed above the transmit coils 714a-714d at a distance based on the wireless power transfer application being designed. For example, for high-power wireless power transfers (e.g., wireless power transfers for electric vehicle charging), the distance between the receiver and the transmit coils 714a-

714*d* may be larger than in low-power wireless power transfer applications (e.g., wireless charging of mobile devices).

As shown in FIG. 7*c*, the two transmit coils 714*a* and 714*c* are shown in an adjacent layout (i.e., wherein the transmit coils 714*a* and 714*c* do not overlap and are in the same y-axis plane). Distance $s_3$ depicts the distance between the two transmit coils 714*a* and 714*c*. Although not shown in this figure, transmit coils 714*a* and 714*c* may be located in different y-axis planes. The distance $s_3$ may be a variable distance based on the size of the two transmit coils 714*a* and 714*c* and/or the wireless power transfer application for transmit area 700.

Figure 8A:
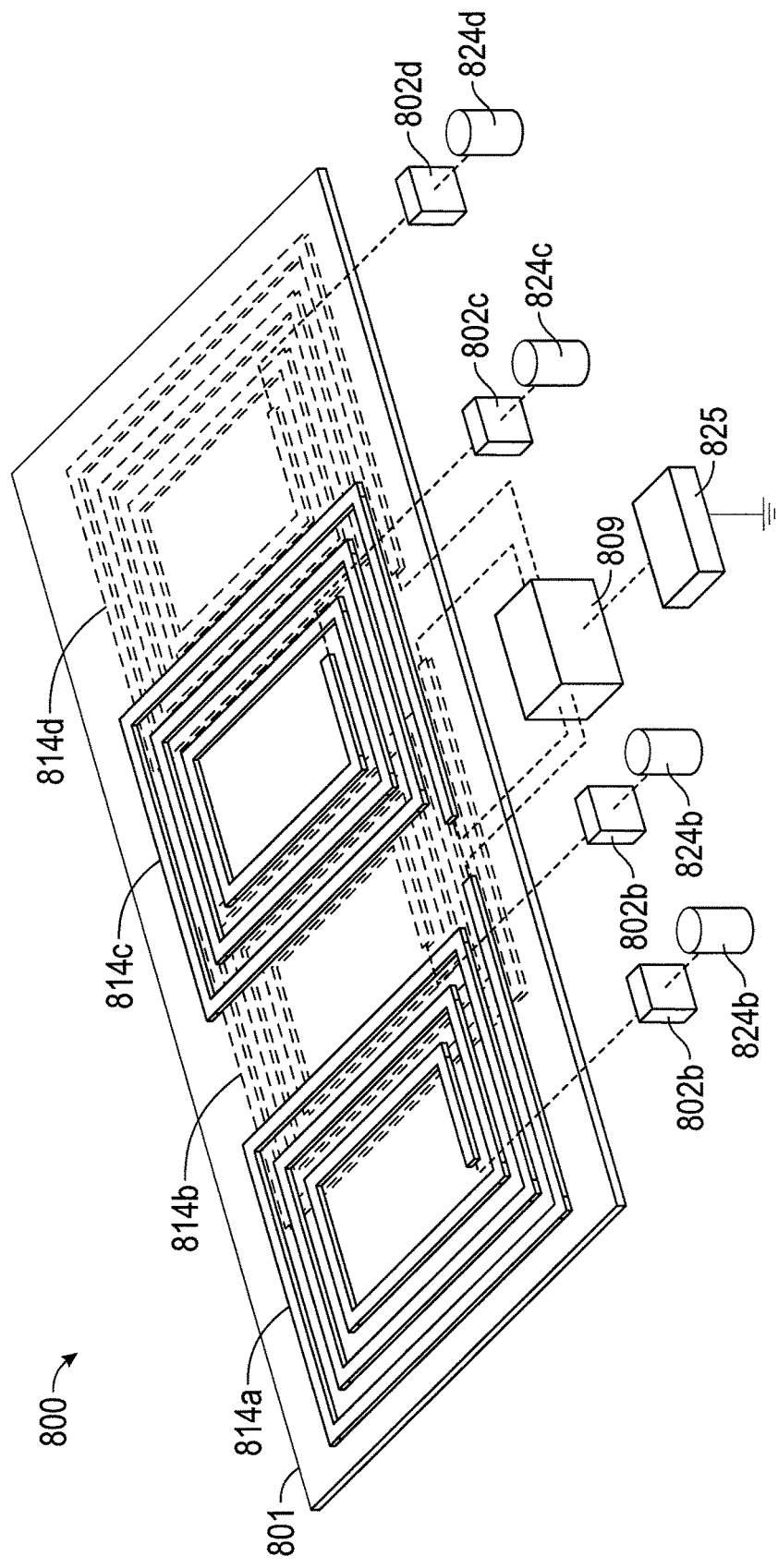
FIG. 8a is a perspective view of a transmit area without a mutual inductance cancellation circuit, in accordance with an exemplary embodiment.

FIG. 8*a* is a perspective view of an exemplary transmit area 800 in accordance with an exemplary embodiment. As shown, the transmit area 800 includes four transmit circuits. The transmit circuits of transmit area 800 may comprise the transmitters and/or transmit circuitry described above in relation to FIGS. 1-6. The transmit circuits comprise a first power amplifier (PA) 824*a*, a second PA 824*b*, a third PA 824*c*, and a fourth PA 824*d*. The PAs 824*a*-824*d* are connected to the respective resonant capacitors 802*a*-802*d* before feeding the transmit coils 814*a*-814*d*. The transmit area 800 further includes a first transmit coil 814*a*, a second transmit coil 814*b*, a third transmit coil 814*c*, and a fourth transmit coil 814*d*, a cancellation circuit 809, and a common ground 825 to which all the transmit coils 814*a*-814*d* connect through the cancellation circuit 809. Thus, the first end of the transmit coils 814*a*-814*d* are connected to their respective PAs 824 and the second end of the transmit coils 814*a*-814*d* are connected to the common ground 825 through the cancellation circuit 809. Although the transmit area 800 depicted in FIG. 8*a* includes four transmit circuits, in other embodiments, more or fewer transmit circuits (and their associated components) may be included in the transmit area 800. In some embodiments, the common ground 825 may also be shared with one or more of the PAs 824*a*-824*d*.

The transmit coils 814*a*-814*d* are shown as being rectangular; however, in some embodiments, the transmit coils 814*a*-814*d* may be of any other shape (e.g., triangular, circular, hexagonal, etc.). In some embodiments, the transmit coils 814*a*-814*d* may form an array of transmit coils, wherein each transmit coil 814*a*-814*d* is positioned substantially adjacent to the other transmit coils 814*a*-814*d* of the transmit area 800. In some embodiments, the transmit coils 814*a*-814*d* may be positioned in an overlapping manner, wherein each of the transmit coils 814*a*-814*d* may overlap with one or more other transmit coils 814*a*-814*d* in the transmit area 800. Additionally, the transmit coils 814*a*-814*d* depicted in FIG. 8*a* are multi-turn coils. However, in other embodiments, the transmit coils 814*a*-814*d* may be single turn coils and may be either single- or multi-layer coils. In some embodiments, the transmit coils 814*a*-814*d* may have inductances of 2000 nH. In other embodiments, the transmit coils 814*a*-814*d* may have inductances greater than or less than 2000 nH. In other embodiments, each of the transmit coils 814*a*-814*d* may have inductances of different values, or various combinations of transmit coils 814*a*-814*d* may share inductances of different values.

As described above, each of the PAs 824*a*-824*d* and transmit coils 814*a*-814*d* may form individual transmit circuits, wherein none of the transmit circuits may be connected at any point except for at the common ground 825 and at the connections of the cancellation circuit 809. The transmit circuits serve to generate a wireless field (not shown) to transmit power and/or communications wirelessly to one or more receivers or receive circuits (not shown). Though not shown in this figure, each of the transmit circuits may include resonant capacitors. As depicted, certain of the four transmit coils 814*a*-814*d* of the transmit circuits may be disposed on the same (i.e., coplanar) or opposite sides of a circuit board. In some embodiments, the four transmit coils 814*a*-814*d* may be disposed on the same side of a printed circuit board (PCB 801). In some other embodiments, one or more (for example, pairs) of the transmit coils 814*a*-814*d* may be disposed on opposite sides of the PCB 801. For example, transmit coils 814*a* and 814*c* may be on one side of the PCB 801, while transmit coils 814*b* and 814*d* may be on the opposite side of the PCB 801. While the four transmit coils 814*a*-814*d* of the transmit circuits depicted are shown substantially located in one of two planes (i.e., opposite sides of the PCB 801) in relation to one another, in other embodiments, the transmit coils 814*a*-814*d* of the transmit circuits may be disposed in more or fewer planes (or layers) in relation to one another. Additionally, in some embodiments, the PAs 824*a*-824*d* may be disposed on the PCB 801 with the transmit coils 814*a*-814*d* and the associated circuitry (i.e., the resonant capacitors 802*a*-802*d*). In some embodiments, the PAs 824*a*-824*d* may not be disposed on the PCB 801 but may have connectors on the PCB 801 such that they may be connected to their respective transmit coils 814*a*-814*d*. In some embodiments, the cancellation circuit 809 may be disposed on the PCB 801 (as shown in FIG. 8*a*). In some embodiments, the common ground 825 may be disposed on the PCB 801 or may be a connection shared by the entire PCB 801.

The transmit circuits may each be configured to generate a wireless field by the associated transmit coils 814*a*-814*d* based on a signal generated by the PAs 824*a*-824*d*, as discussed above in relation to FIG. 4. However, when the transmit circuits are in close proximity with other transmit circuits (i.e., the transmit coil 814*a* from one transmit circuit is in close proximity with the transmit coil 814*b* from another transmit circuit), a mutual inductance (due to a mutual coupling between each pair of the transmit coils 814*a*-814*d*) may be generated between the transmit coils 814*a*-814*d*. The cancellation circuit 809 may be configured to reduce and/or eliminate the mutual inductance generated between transmit coils 814*a*-814*d*. The cancellation circuit 809 may comprise one or more electrical components configured to add to or subtract from the mutual inductance of one or more pairs of transmit coils 814*a*-814*d* or the mutual inductance of all of the transmit coils 814*a*-814*d*. In some embodiments, the cancellation circuit 809 may be configured to move at least one of the transmit coils 814*a*-814*d* or the cancellation circuit 809 to compensate for the mutual inductance of one or more of the transmit coils 814*a*-814*d*.

Figure 8B:
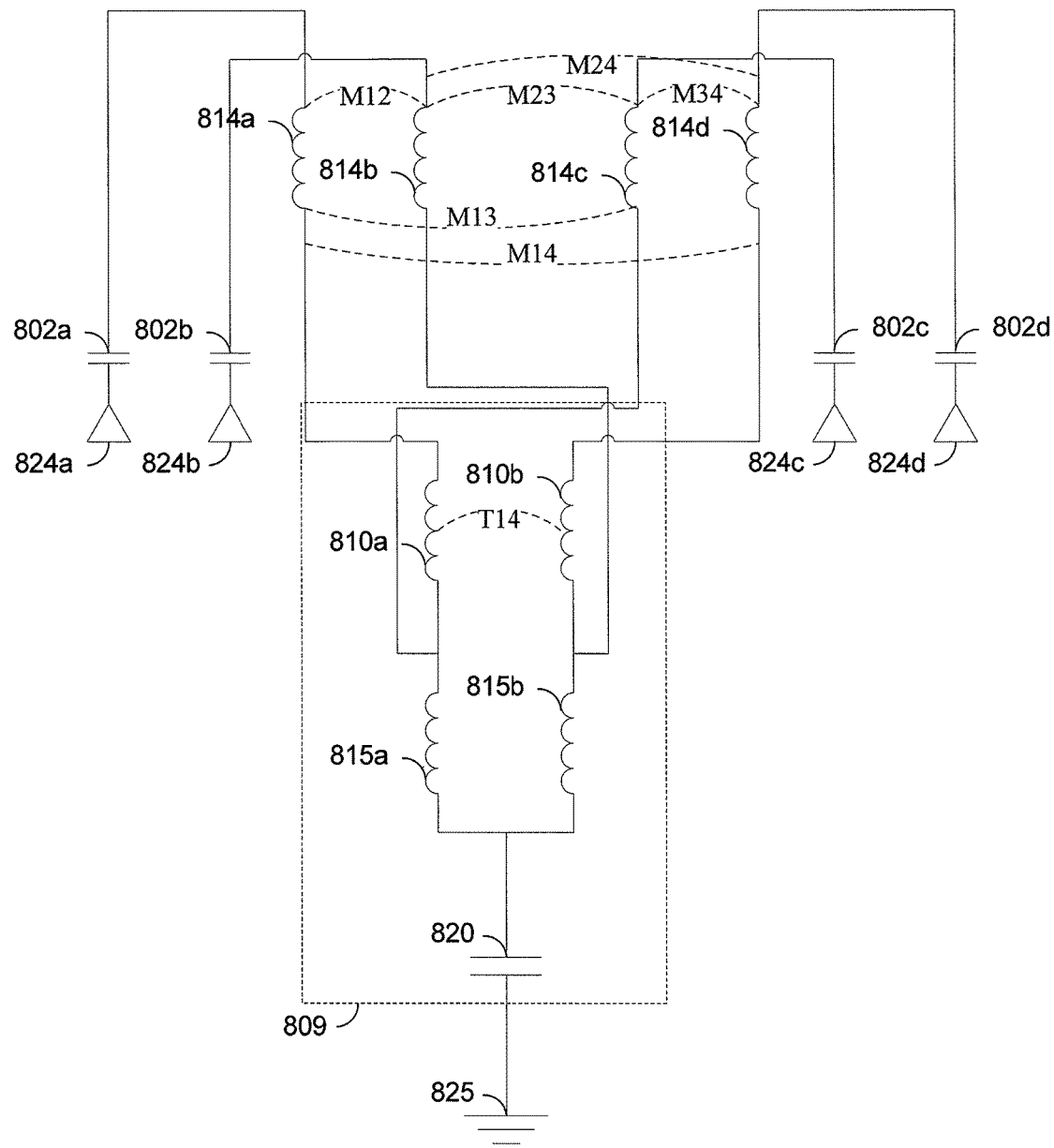
FIG. 8b depicts a schematic diagram of the exemplary transmit area, in accordance with an exemplary embodiment.

FIG. 8*b* depicts a schematic diagram of a system of multiple transmit coils in close proximity each having individual and isolated power amplifiers with a mutual inductance cancellation circuit in accordance with an exemplary embodiment. Similar to FIG. 8*a*, FIG. 8*b* shows four individual transmit circuits. The four transmit circuits may each comprise one of transmit coils 814*a*-814*d*, each of the transmit coils 814*a*-814*d* connected to a power amplifier 824*a*-824*d*, respectively, with a resonant capacitor between the power amplifiers 824*a*-824*d* and the respective transmit coils 814*a*-814*d*. Resonant capacitors 802*a*-802*d* may include one or more of capacitors 354 and/or 357 described above to create a resonant circuit as described above. On the opposite end of the transmit coils 814*a*-814*d*, each of the transmit circuits has a return that is connected directly to a common ground via the mutual inductance cancellation circuit 809. The cancellation circuit 809 may comprise one or more electrical components configured to add positive or negative mutual inductance to the mutual inductance between proximal transmit coils 814a-814d when one or more of the transmit coils 814a-814d is active. The number of electrical components in the cancellation circuit 809 may vary based at least in part on the number of transmit coils 814a-814d in the array. By using coupled inductors and capacitors in various arrangements and configurations, positive and/or negative inductances may be introduced to the mutual inductances between the transmit coils 814a-814d.

The cancellation circuit 809 may allow for the compensation of mutual inductance between individual pairs of transmit coils 814a-814d while compensating for the mutual inductances of the entire array of transmit coils 814a-814d. For example, inductors 810a and 810b may comprise a pair of coupled inductors forming a transformer T14 between transmit coils 814a and 814d. Transmit coil 814a feeds through the transformer formed by inductors 810a and 810b, similar to transmit coil 814d. The transformer formed by inductors 810a and 810b allows you to contribute to the mutual inductance of transmit coils 814a and 814d.

Inductor 815a may be in series with transmit coils 814a and 814c, such that the currents of the transmit coils 814a and 814c sum up through the inductor 815a. Inductor 815b may be in series with transmit coils 814b and 814d such that the currents of the transmit coils 814b and 814d sum up through the inductor 815b. Inductor 815a may allow for control of the mutual inductance between transmit coils 814a and 814c independent of the transformer formed by inductors 810a and 810b. Similarly, inductor 815b may allow for control of the mutual inductance between transmit coils 814b and 814d independent of the transformer formed by inductors 810a and 810b. The inductor 815a may add inductance to the mutual inductance of the transmit coils 814a and 814c. Accordingly, since the mutual inductance between transmit coils 814a and 814c is negative (as described above), the inductor 815a in series with these two transmit coils 814a and 814c adds a positive inductance to the negative mutual inductance and helps to cancel out this mutual inductance. Similarly, inductor 815b may add a positive inductance to the mutual inductance of the transmit coils 814b and 814d, which is negative (as described above) because the transmit coils 814b and 814d are adjacent. Accordingly, the inductance from inductor 815b in series with the transmit coils 814b and 814d helps to cancel out the mutual inductance mutual inductance between the transmit coils 814a-814d.

Coupled inductors 810a and 810b may be configured to add positive mutual inductance between transmit coils 814a and 814d. Inductor 815a may be configured to add positive mutual inductance between transmit coils 814a and 814c, while inductor 815b may be configured to add positive mutual inductance between transmit coils 814b and 814d. Capacitor 820 may be configured to add negative mutual inductance between all transmit coils 814a-814d. In some embodiments, inductors and/or capacitors may be interchanged to add positive or negative mutual inductance in any of these locations or in new locations and between different, new connections.

Capacitor 820 is in series with all four transmit coils 814a-814d to ground. The capacitor 820 adds a negative inductance between all the transmit coils 814a-814d and shifts the mutual inductance of all four transmit coils 814a-814d relative to each other (acting as the final centering around zero). The capacitor 820 may be used to change the mutual inductances of each of the transmit coils 814a-814d by the same amount.

In relation to FIGS. 8a and 8b, the mutual inductances may be generated between adjacent or overlapping transmit coils 814a-814d when one or more of the adjacent transmit coils 814a-814d is activated (generating a wireless field) with a fluctuating/varying current. For example, mutual inductance M12 may represent the mutual inductance created between transmit coils 814a and 814b when at least one of the two transmit coils 814a-814b are active. Similarly, mutual inductance M23 may represent the mutual inductance created between transmit coils 814b and 814c, while mutual inductance M13 may represent the mutual inductance between transmit coils 814a and 814c. Mutual inductance M34 may represent the mutual inductance generated between transmit coils 814c and 814d when at least one of the transmit coils 814c and 814d have current flow through them. Mutual inductance M14 represents the mutual inductance generated during operation of one or more of transmit coils 814a and 814d, while mutual inductance M24 represents the mutual inductance that is generated between transmit coils 814b and 814d.

As discussed above and as shown in the example values in Table 3 below in light of the components shown in FIG. 8b, the coupling coefficients associated with the mutual inductances between the various combinations of transmit coils 814a-814d may vary based on distance between the two transmit coils 814a-814d when the transmit coils 814a-814d are each of approximately the same size. The coupling coefficient (k) values shown below may be based off a wireless power transfer system 100 comprising transmit coils 814a-814d having inductances of 2000 nH and resonant capacitors 802a-802d having capacitances of 258 pF, 266 pF, 266 pF, and 259 pF, respectively. In some embodiments, any of these inductances or capacitances may be of a different value and cause the mutual coupling coefficient value (k) to change. Furthermore, the coupled inductors 810a-810b may have inductances of 65 nH and a coupling coefficients of 0.99, while the inductors 815a and 815b may each have an inductance of 110 nH. Capacitor 820 may have a capacitance of 12600 pF.

TABLE 3

(same as TABLE 1)

| Transmit Coil Combination | Mutual Inductance Coupling coefficient (k) Value |
| --- | --- |
| 814a-814b | .024 |
| 814a-814c | .035 |
| 814a-814d | .0085 |
| 814b-814c | .018 |
| 814b-814d | .035 |
| 814c-814d | .022 |

These mutual inductances between the adjacent transmit coils 814a-814d may correspond to the mutual inductances between the indicated transmit coil 814a-814d combinations as shown in the example values in Table 4 below.

TABLE 4

| Transmit Coil Combination | Mutual Inductance Value |
| --- | --- |
| 814a-814b | 4.267 |
| 814a-814c | −3.733 |
| 814a-814d | 3.617 |

TABLE 4-continued

| Transmit Coil Combination | Mutual Inductance Value |
|---|---|
| 814b-814c | −7.733 |
| 814b-814d | −3.733 |
| 814c-814d | 0.267 |

As shown by comparison of Tables 2 and 4, the cancellation circuit 809 allows the plurality of transmit coils 814a-814d to share the common ground 825 while canceling or greatly reducing mutual inductances between the various combinations of transmit coils 814a-814d. In some embodiments, the components within the cancellation circuit 809 may allow for the reduction of the mutual inductance between combinations of the transmit coils 814a-814d, but may not allow for the elimination of the mutual inductance. Accordingly, in some embodiments, the cancellation circuit 809 and may utilize the translation of one or more transmit coils 814a-814d of the plurality of transmit coils 814a-814d in at least one of an x- or y-direction in relation to the other transmit coils 814a-814d with which each transmit coil 814a-814d overlaps. In some embodiments, moving the overlapping transmit coils 814a-814d such that the amount of overlap increases or decreases may increase or decrease the mutual inductance between the overlapping transmit coils.

In some embodiments, the cancellation circuit 809 itself may be moved a different location in relation to the transmit coils 814a-814d. Such movement may affect the impact of the cancellation circuit 809 on the transmit coils 814a-814d. For example, when the cancellation circuit 809 is centered between all of the transmit coils 814a-814d, the cancellation circuit 809 may interact with the transmit coils 814a-814d differently than when the cancellation circuit 809 is positioned at one end or the other of the array of four transmit coils 814a-814d.

Figure 8C:
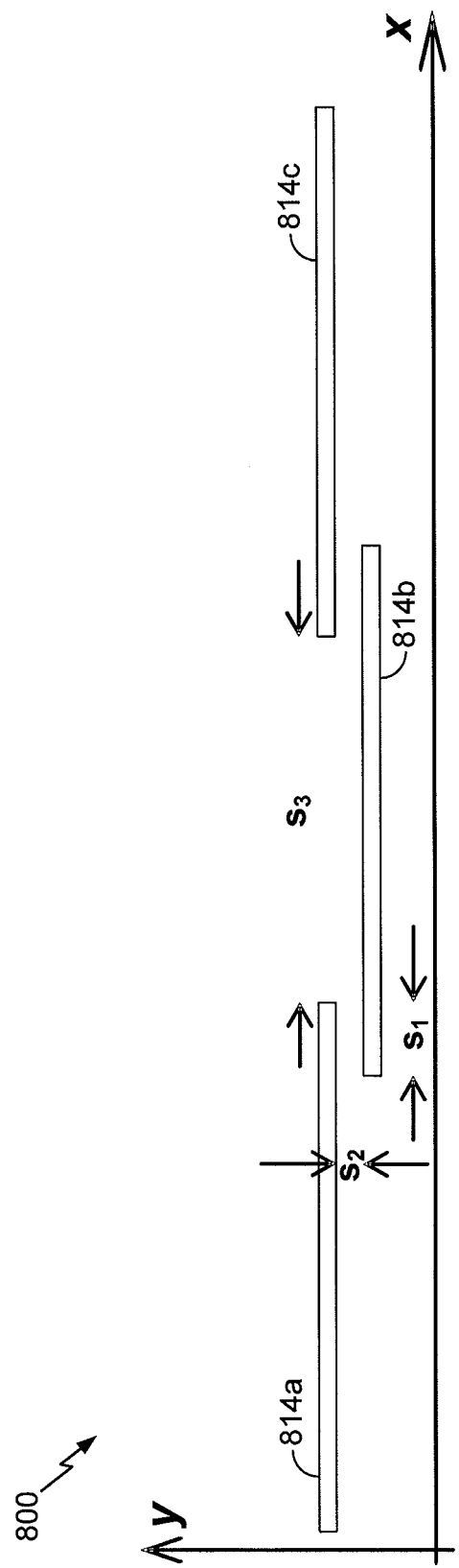
FIG. 8c depicts a horizontal view of a layout of the transmit coils in relation with one another, in accordance with an exemplary embodiment.

FIG. 8c depicts a horizontal view of a layout of the transmit coils 814a-814c of transmit area 800 in relation with one another, in accordance with an exemplary embodiment. The layout and components of FIG. 8c are similar to those explained above in relation to FIG. 7c and need not be explained again here.

The integration of the cancellation circuit 809 may be advantageous because it may allow the independent control of mutual inductances of different combinations of the transmit coils 814a-814d. As described above, the transformer formed by inductors 810a and 810b may control the mutual inductance between transmit coils 814a and 814d, while the inductors 815a and 815b may control the mutual inductance of transmit coils 814a with 814c and 814b with 814d, respectively. As discussed above, the capacitor 820 may allow for the adjustment of the mutual inductance of each of the transmit coils 814a-814d by the same amount. Accordingly, there may be no physical component (inductive or capacitive) in the cancellation circuit 809 allowing for adjustment of the mutual inductances of the consecutive pairs of transmit coils 814a-814d (i.e., pair of transmit coils 814a with 814b, pair of transmit coils 814b with 814c, and pair of transmit coils 814c with 814d). However, the mutual inductances between these pairs of transmit coils 814a-814d may be affected by their respective overlap (i.e., the overlap of transmit coils 814a and 814b may affect the mutual inductance between these coils M12). Accordingly, the mutual inductances between these consecutive pairs of transmit coils 814a-814d may be "adjusted" or compensated for by manipulating the physical location (i.e., overlap) of at least one of the transmit coils 814a-814d or the cancellation circuit 809. For example, the overlap of the pairs of transmit coils 814a-814d may be altered to adjust the mutual inductance between the pairs of overlapping transmit coils 814a-814d. In some embodiments, the manipulation of the overlap of the pairs of transmit coils 814a-814d may only affect the mutual inductance of the overlapping transmit coils 814a-814d. In some embodiments, the physical locations and overlap of the transmit coils 814a-814d may be adjusted when designing the transmit area 800. For example, the positions of each transmit coil 814a-814d in relation to the neighboring transmit coils 814a-814d may be such that the mutual inductances between the transmit coils 814a-814d are minimized or reduced.

Adjusting the mutual inductance of the transmit coils 814a-814d using the components of the cancellation circuit 809 may be described as "coarse" tuning of the mutual inductances, while adjusting the overlap of the pairs of transmit coils 814a-814d may comprise "final" tuning or "fine" tuning of the mutual inductances of the transmit coils 814a-814d. In some embodiments, additional inductors and/or capacitors may be included in the cancellation circuit 809 to allow for individual control of each pair of transmit coils 814a-814d (for example, inductors may be introduced in series with each of pair of transmit coils 814a-814b, 814b-814c, and 814c-814d). Alternatively, as discussed above, the cancellation circuit 809 may be relocated, thus changing the effects of the cancellation circuit 809 on the mutual inductances of the transmit coils 814a-814d. Thus, the combination of the inductors 810a, 810b, 815a, and 815b and capacitor 820 and the alignment of the transmit coils 814a-814d (adjustment of overlap) and the alignment of the cancellation circuit 809 may allow for the compensation for all of the combinations of mutual inductance between the transmit coils 814a-814d.

The physical location of the cancellation circuit 809 may alter the mutual inductance of combinations of the transmit coils 814a-814d because aspects of the transmit coils 814a-814d change as the location of the cancellation circuit 809 is altered. For example, at least the lengths of the transmit coils 814a-814d may each change depending upon the location of the cancellation circuit, as the length of the transmit coils 814a-814d may alter the mutual inductance effects of the transmit coils 814a-814d on each other and in relation to the cancellation circuit 809. Accordingly, in some embodiments, the cancellation circuit 809 may be located in the transmit area 800 such that the mutual inductances between the various combinations of the transmit coils 814a-814d are minimized or reduced.

One advantage of implementing the cancellation circuit 809 is that individual transmit coils 814a-814d in the array of transmit coils 814a-814d may be activated as needed according to a receiving load. Additionally, since the array of transmit coils 814a-814d may be divided into individual transmit coils 814a-814d (i.e., each individual transmit coil 814a-814d may be independently driven), the PAs 824a-824d driving the transmit coils 814a-814d may equally distribute any load seen by the array of transmit coils 814a-814d (i.e., for the system 800 of FIG. 8a, four transmit coils 814a-814d with four independent PAs 824a-824d means that each PA need generate one-fourth (¼) of the total power needed. In some embodiments, the cancellation circuit 809 may allow for the use of a single PA of the PAs 824a-824d to drive the transmit coils 814a-814d without coupling multiple PAs 824a-824d to provide a sufficient high power. Additionally, when a load is applied to the array of transmit coils 814a-814d, the cancellation circuit 809 will allow a single transmit coils 814a-814d to be activated with its associated PA 824a-824d without damaging neighboring transmit coils 814a-814d of the array via mutual inductance. Accordingly, the cancellation circuit 809 may provide for more efficient power transfer by eliminating mutual inductances between transmit coils 814a-814d.

Figure 9:
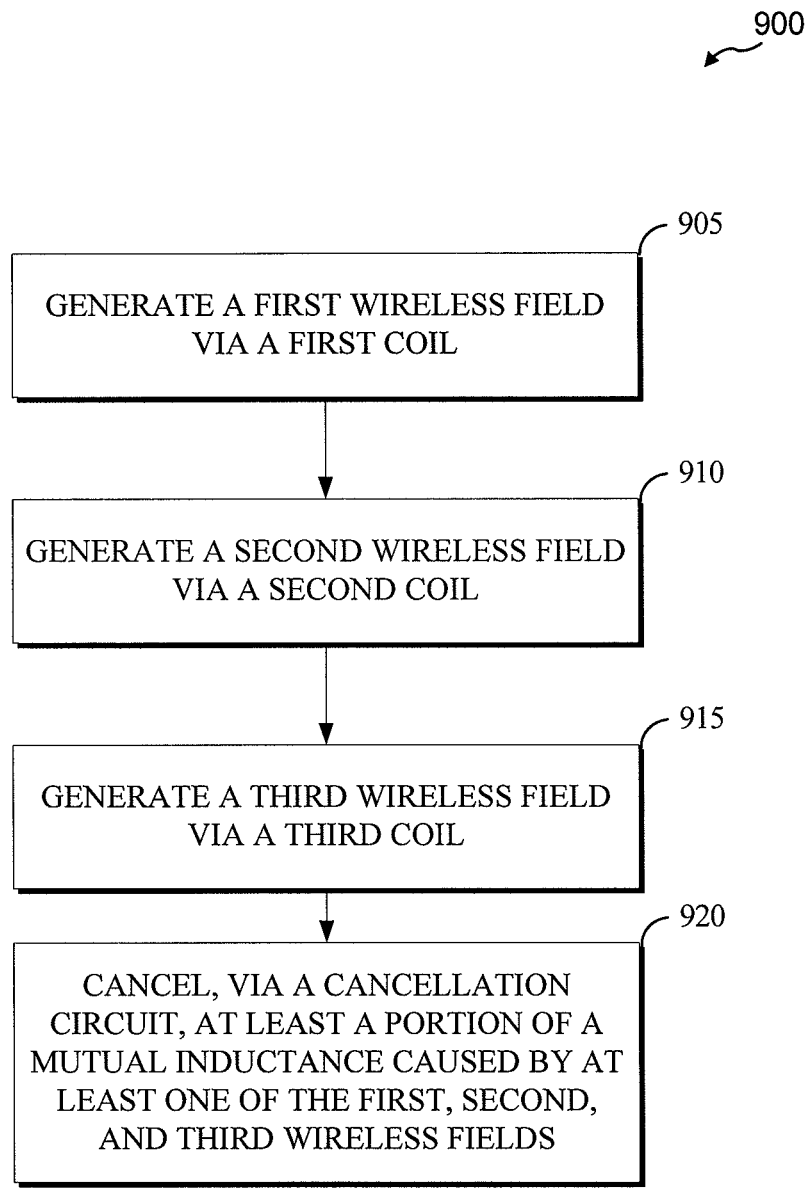
FIG. 9 is a flowchart 900 of an exemplary method of wireless power transmission, in accordance with an exemplary embodiment.

FIG. 9 is a flowchart 900 of an exemplary method of wireless power transmission in accordance with an exemplary embodiment. Although the method of flowchart 900 is described herein with reference to the wireless power transmission system 100 discussed above with respect to FIGS. 1-2, the transmitter discussed above with respect to FIG. 4, and the transmit area 800 discussed above with respect to FIGS. 8a-8c, in some embodiments, the method of flowchart may be implemented by another device described herein, or any other suitable device. In some embodiments, the blocks in flowchart 900 may be performed by a processor or controller, such as, for example, the controller 415 (referenced in FIG. 4) and/or the processor-signaling controller 516 (referenced in FIG. 5). Although the method of flow chart 900 is described herein with reference to a particular order, in various embodiments, blocks herein can be performed in a different order, or omitted, and additional blocks may be added.

At block 905, a first driver coil (one of transmit coils 814a-814d) generates a first wireless field. Any one of transmit antennas 814a-814d may generate the first wireless field. The wireless field may be used to wirelessly transfer power to or wirelessly communicate with another device. At block 910, a second driver coil (a second of the transmit coils 814a-814d) generates a second wireless field. At block 915, a third driver coils (a third of the transmit coils 814a-814d) generates a third wireless field. At block 920, the cancellation circuit 809 cancels at least a portion of the mutual inductance caused by at least one of the first wireless field, the second wireless field, and the third wireless field generated by the first driver coil, the second driver coil, and the third driver coil, respectively. In some embodiments, as described above, the cancellation circuit adds positive and/or negative mutual inductance to each of the first, second, and third transmit coils generating the first, second, and third wireless fields. In some embodiments, the cancellation circuit 809 may add positive inductance using inductors (i.e., inductors 810a-810b or 815a-815b) in series with the transmit coils 814a-814d. In some embodiments, the cancellation circuit 809 may add negative inductance using capacitors (i.e., capacitors 820) in series with the transmit coils 814a-814d. In some embodiments, the cancellation circuit 809 may be further configured to move at least one of the transmit coils 814a-814d or the cancellation circuit 809 in at least one of the x- or y-directions to fine tune the mutual inductance of the transmit coils 814a-814d.

As discussed above, the transmit coils 814a-814d may share the common ground 825 by connecting to the common ground 825 via the cancellation circuit 809. In some embodiments, the common ground 825 may also be shared with the power amplifiers 824 connected to each of the transmit coils 814a-814d. In some embodiments, the cancellation circuit 809 may at least partially cancel at least one of a positive mutual inductance and a negative mutual inductance. In some embodiments, each of the power amplifiers 824a-824d used to drive the driver coils (transmit coils 814a-814d) may be driven out of phase with each other in 90-degree steps between adjacent driver coils. The capacitor 820 and/or the inductors 810a-810b/815a-815b may bridge any two or more of the driver coils (transmit coils 814a-814d). In some embodiments, a transformer may be formed from two or more inductors 810a-810b/815a-815b. In some embodiments, the driver coils (transmit coils 814a-814d) may be configured to overlap with at least one other driver coil. In some embodiments, the driver coils may be disposed in a co-planar or non-coplanar manner.

Figure 10:
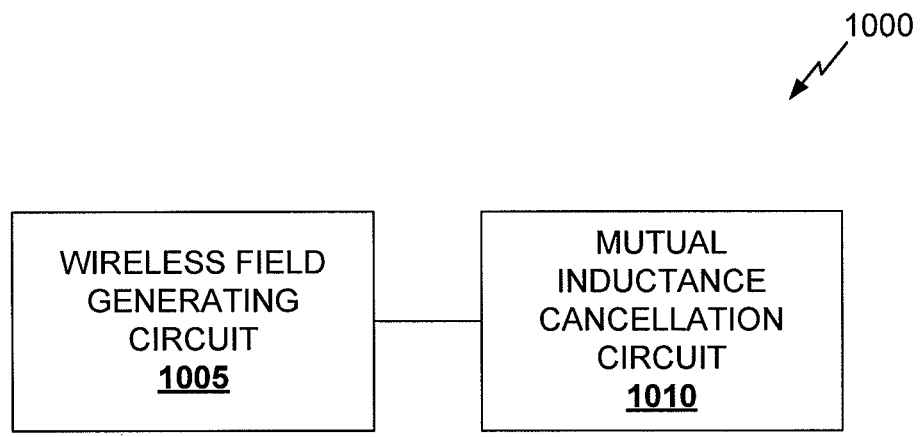
FIG. 10 is a functional block diagram of a system for transferring wireless power to a receiver, in accordance with an exemplary embodiment.

FIG. 10 is a functional block diagram of a system for transferring wireless power to a receiver, in accordance with an exemplary embodiment of the invention. The device configured for wireless power transmission 1000 comprises first means 1005 for generating a wireless field and a mutual inductance canceling means. In some embodiments, the means 1005 for generating a wireless field may comprise a plurality of means for generated wireless fields.

In an embodiment, the first means 1005 for generating a wireless field may be configured to perform one or more of the functions described above with respect to block 905 (FIG. 9). In various embodiments, the first means 1005 for generating wireless fields may be implemented by one or more of the transmit coils 814a-814d of FIG. 8a-8d. In some embodiments, a plurality of first means 1005 for generating a wireless field may be configured to perform one or more of the functions described above with respect to block 905 (FIG. 9).

The second means 1010 for cancelling mutual inductance may be configured to perform one or more of the functions described above with respect to block 910 (FIG. 9). In various embodiments, the second means 1010 for cancelling mutual inductance may be implemented by one or more of the cancellation circuit 809. In some embodiments, additional means may be configured to perform one or more of the steps described above in relation to FIG. 9. In some embodiments, means for amplifying power may be configured to amplify power for transmission by the means for generating a wireless field to generate a wireless field (not shown). In some embodiments, the means for amplifying power may comprise the power amplifiers 824a-824d described above. In some embodiments, means for sharing a common ground with the means for generating a wireless field may be configured to connect the means for generating a wireless field to a single ground. In some embodiments, the single ground may be shared with the means for generating a wireless field and the means for amplifying power. In some embodiments, means for adjusting a position of at least one of the means for generating a wireless field and/or means for adjusting a position of the means for canceling mutual inductance may be configured to physically move at least one of the means for generating a wireless field and/or the means for canceling mutual inductance. In some embodiments, the means for a position of at least one of the means for generating a wireless field and/or means for adjusting a position of the means for canceling mutual inductance may comprise one of a x-y translation motor or similar device configured to physically move in an x- and y-direction.

The various operations of methods described above can be performed by any suitable means capable of performing the operations, such as various hardware and/or software component(s), circuits, and/or module(s). Generally, any operations illustrated in the Figures can be performed by corresponding functional means capable of performing the operations.

Information and signals can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination thereof.

The various illustrative logical blocks, modules, circuits, and algorithm steps described in connection with the embodiments disclosed herein can be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the embodiments of the invention.

The various illustrative blocks, modules, and circuits described in connection with the embodiments disclosed herein can be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor can be a microprocessor, but in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein can be embodied directly in hardware, in a software module executed by a processor, or in a combination of the two. If implemented in software, the functions can be stored on or transmitted over as one or more instructions or code on a tangible, non-transitory computer-readable medium. A software module can reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium can be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media. The processor and the storage medium can reside in an ASIC. The ASIC can reside in a user terminal. In the alternative, the processor and the storage medium can reside as discrete components in a user terminal.

For purposes of summarizing the disclosure, certain aspects, advantages and novel features of the inventions have been described herein. It is to be understood that not necessarily all such advantages can be achieved in accordance with any particular embodiment of the invention. Thus, the invention can be embodied or carried out in a manner that achieves or optimizes one advantage or group of advantages as taught herein without necessarily achieving other advantages as can be taught or suggested herein.

Various modifications of the above described embodiments will be readily apparent, and the generic principles defined herein can be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A device configured to transmit wireless power to a first receiver, comprising:
    a first driver coil;
    a second driver coil;
    a third driver coil; and
    a circuit operably coupled to the first driver coil, the second driver coil, and the third driver coil and configured to at least partially cancel mutual inductance between the first driver coil, the second driver coil, and the third driver coil, the first, second, and third driver coils configured to share a common ground via the circuit,
    wherein each of the first, second, and third driver coils are driven by a corresponding first power amplifier, second power amplifier, and third power amplifier, respectively, and wherein each of the first, second, and third power amplifiers are driven out of phase of each other.

2. The device of claim 1, wherein the circuit is configured to at least partially cancel at least one of a positive mutual inductance or a negative mutual inductance between various combinations of the first, second, and third driver coils.

3. The device of claim 1, wherein the one or more of the first, second, and third driver coils are positioned in relation to each other such that mutual inductances between the first, second, and third driver coils are reduced.

4. The device of claim 1, wherein the circuit is positioned in relation to the first, second, and third driver coils such that mutual inductances between the first, second, and third driver coils are reduced.

5. The device of claim 1, wherein each of the first, second, and third power amplifiers are driven out of phase with each other in 90-degree steps.

6. A device configured to transmit wireless power to a first receiver, comprising:
    a first driver coil;
    a second driver coil;
    a third driver coil; and
    a circuit operably coupled to the first driver coil, the second driver coil, and the third driver coil and configured to at least partially cancel mutual inductance between the first driver coil, the second driver coil, and the third driver coil, the first, second, and third driver coils configured to share a common ground via the circuit,
    wherein the circuit comprises a capacitor configured to add negative mutual inductance to one or more coupled driver coils.

7. The device of claim 1, wherein the circuit comprises a capacitor configured to bridge the first, second, and third driver coils.

8. A device configured to transmit wireless power to a first receiver, comprising:
    a first driver coil;
    a second driver coil;
    a third driver coil; and
    a circuit operably coupled to the first driver coil, the second driver coil, and the third driver coil and configured to at least partially cancel mutual inductance between the first driver coil, the second driver coil, and the third driver coil, the first, second, and third driver coils configured to share a common ground via the circuit, wherein the circuit comprises an inductor configured to add positive mutual inductance to one or more coupled driver coils.

9. The device of claim 1, wherein the circuit comprises an inductor configured to bridge any two driver coils.

10. The device of claim 1, wherein any two of the first, second, and third driver coils are co-planar.

11. The device of claim 10, wherein the circuit comprises a transformer configured to bridge any two non-coplanar and non-overlapping driver coils.

12. The device of claim 1, wherein at least one of the first driver coil, the second driver coil, and the third driver coil overlap with at least one other of the first driver coil, the second driver coil, or the third driver coil.

13. The device of claim 1, wherein none of the first driver coil, the second driver coil, and the third driver coil overlap with any other of the first driver coil, the second driver coil, or the third driver coil.

14. The device of claim 1, wherein the circuit is configured to at least partially cancel a number of mutual inductances based at least in part on a number of driver coils of the device.

15. A method for transmitting wireless power to a receiver, comprising:
generating, via a first driver coil, a first wireless field;
generating, via a second driver coil, a second wireless field;
generating, via a third driver coil, a third wireless field;
canceling, via a cancellation circuit operably coupled to the first driver coil, the second driver coil, and the third driver coil and configured to at least partially cancel mutual inductance between the first driver coil, the second driver coil, and the third driver coil, at least a portion of a mutual inductance caused by at least one of the first wireless field, the second wireless field, and the third wireless field; and
driving each of the first, second, and third driver coils with a corresponding first power amplifier, second power amplifier, and third power amplifier, respectively, wherein each of the first, second, and third power amplifiers are driven out of phase with each other.

16. The method of claim 15, wherein canceling at least a portion of a mutual inductance comprises at least partially canceling at least one of a positive mutual inductance or a negative mutual inductance caused by at least one of the first, second, and third wireless fields.

17. The method of claim 15 further comprising adjusting a position of one or more of the first, second, and third driver coils in at least one of an x- and a y-direction.

18. The method of claim 15, further comprising adjusting a position of the cancellation circuit in at least one of an x- and a y-direction.

19. The method of claim 15, further comprising at least partially cancelling a number of mutual inductances based at least in part on a number of driver coils.

20. A device configured to transmit wireless power to a first receiver, comprising:
means for generating a first wireless field;
means for generating a second wireless field;
means for generating a third wireless field;
means for canceling mutual inductance operably coupled to the means for generating the first wireless field, the means for generating the second wireless field, and the means for generating the third wireless field and configured to at least partially cancel mutual inductance between the means for generating the first wireless field, the means for generating the second wireless field generating means, and the means for generating the third wireless field, the means for generating the first wireless field, the means for generating the second wireless field, and the means for generating the third wireless field each configured to share a common ground via the mutual inductance canceling means;
means for driving the means for generating the first wireless field;
means for driving the means for generating the second wireless field; and
means for driving the means for generating the third wireless field,
wherein each of the means for driving the means for generating the first wireless field, the means for driving the means for generating the second wireless field, and the means for driving the means for generating the third wireless field are driven out of phase with each other.

21. The device of claim 20, wherein the means for canceling is configured to at least partially cancel at least one of positive mutual inductance and a negative mutual inductance between various combinations of the means for generating the first wireless field, the means for generating the second wireless field, and the means for generating the third wireless field.

22. The device of claim 6, wherein the circuit comprises an inductor configured to add positive mutual inductance to one or more coupled driver coils.

23. The device of claim 6, wherein any two of the first, second, and third driver coils are co-planar.

24. The device of claim 6, wherein at least one of the first driver coil, the second driver coil, and the third driver coil overlap with at least one other of the first driver coil, the second driver coil, or the third driver coil.

25. The device of claim 6, wherein the circuit is configured to at least partially cancel a number of mutual inductances based at least in part on a number of driver coils of the device.

26. The device of claim 6, wherein each of the first, second, and third driver coils are driven by a corresponding first power amplifier, second power amplifier, and third power amplifier, respectively.

27. The device of claim 8, wherein the circuit comprises a capacitor configured to add negative mutual inductance to one or more coupled driver coils.

28. The device of claim 8, wherein any two of the first, second, and third driver coils are co-planar.

29. The device of claim 8, wherein at least one of the first driver coil, the second driver coil, and the third driver coil overlap with at least one other of the first driver coil, the second driver coil, or the third driver coil.

30. The device of claim 8, wherein the circuit is configured to at least partially cancel a number of mutual inductances based at least in part on a number of driver coils of the device.

31. The device of claim 8, wherein each of the first, second, and third driver coils are driven by a corresponding first power amplifier, second power amplifier, and third power amplifier, respectively.

* * * * *